(12) United States Patent
Connor et al.

(10) Patent No.: US 11,761,706 B2
(45) Date of Patent: Sep. 19, 2023

(54) FURNACE SYSTEM AND METHOD OF USE

(71) Applicant: Mantle Inc., San Francisco, CA (US)

(72) Inventors: Stephen T. Connor, San Francisco, CA (US); Fabio Zurcher, San Francisco, CA (US); Thale Smith, San Francisco, CA (US)

(73) Assignee: Mantle Inc., San Francisco, CA (US)

( * ) Notice: Subject to any disclaimer, the term of this patent is extended or adjusted under 35 U.S.C. 154(b) by 0 days.

(21) Appl. No.: 17/694,303

(22) Filed: Mar. 14, 2022

(65) Prior Publication Data

US 2022/0196327 A1 Jun. 23, 2022

Related U.S. Application Data

(62) Division of application No. 17/112,688, filed on Dec. 4, 2020, now Pat. No. 11,306,968.

(60) Provisional application No. 62/943,675, filed on Dec. 4, 2019.

(51) Int. Cl.
*F27B 5/04* (2006.01)
*F27B 5/18* (2006.01)

(52) U.S. Cl.
CPC . *F27B 5/04* (2013.01); *F27B 5/18* (2013.01)

(58) Field of Classification Search
CPC .................................................. C21D 9/0043
USPC .................................. 481/119, 123; 219/385
See application file for complete search history.

(56) References Cited

U.S. PATENT DOCUMENTS

| | | | |
|---|---|---|---|
| 1,516,645 A * | 11/1924 | Rennerfelt | C21D 9/0043 148/633 |
| 5,018,707 A | 5/1991 | Hemsath et al. | |
| 5,271,376 A | 12/1993 | Lu et al. | |
| 5,970,308 A | 10/1999 | Garg et al. | |
| 2007/0054229 A1 | 3/2007 | Hanzawa et al. | |
| 2019/0160529 A1 | 5/2019 | Silidker et al. | |
| 2019/0255612 A1 | 8/2019 | Mark | |
| 2020/0393126 A1 | 12/2020 | Chao et al. | |
| 2021/0041173 A1 | 2/2021 | Fujishima et al. | |
| 2021/0121954 A1 | 4/2021 | Champion et al. | |
| 2021/0213525 A1 | 7/2021 | Champion et al. | |

FOREIGN PATENT DOCUMENTS

GB  2039775 A  8/1980

OTHER PUBLICATIONS

Furnace atmospheres No. 6 "Sintering of Steels", Linde AG, Gases Division, Germany, 60 pages.
(Continued)

*Primary Examiner* — Steven B McAllister
*Assistant Examiner* — John E Bargero
(74) *Attorney, Agent, or Firm* — Jeffrey Schox; Randy Mehlenbacher

(57) ABSTRACT

A sintering furnace can include an outer shell defining an internal volume a reactive agent inlet configured to introduce a reactive agent into the internal volume; an insulation chamber within the outer shell; and a retort configured to retain an object. A method of operating a sintering furnace can include sintering a part precursor within a retort arranged within a chamber, wherein the chamber defines an intermediate volume between the retort and the chamber, wherein a sintering byproduct is oxidized within the intermediate volume.

21 Claims, 9 Drawing Sheets

(56) References Cited

OTHER PUBLICATIONS

Wang, Jun , et al., "Polycyclic Aromatic Hydrocarbon and Particulate Emissions from Two-Stage Combustion of Polystyrene: The Effect of the Primary Furnace Temperature", Environ. Sci. Technol. 2001, 35, 3541-3552.

* cited by examiner

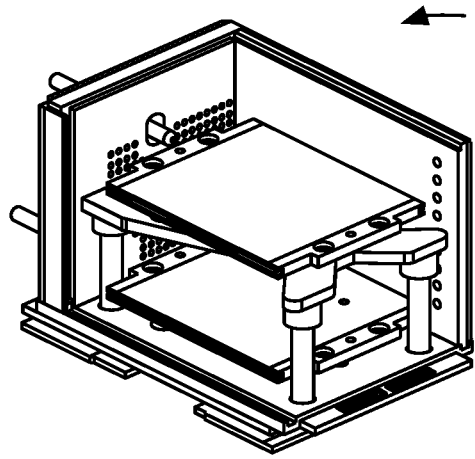
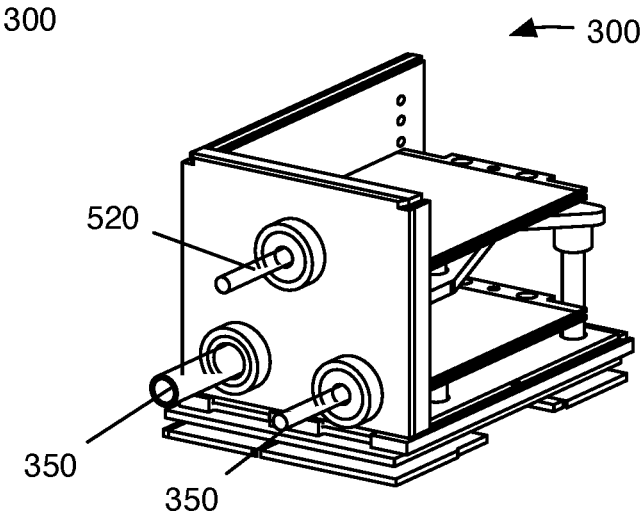
FIGURE 7C　　　　　　　　FIGURE 7D
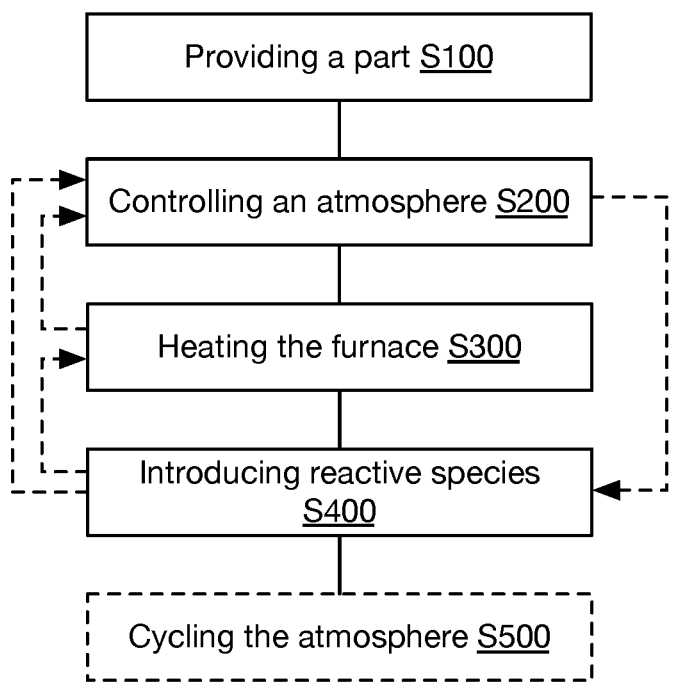
FIGURE 8

FURNACE SYSTEM AND METHOD OF USE

CROSS-REFERENCE TO RELATED APPLICATIONS

This application is a Divisional of U.S. patent application Ser. No. 17/112,688 filed 4 Dec. 2020, which claims the benefit of U.S. Provisional Application No. 62/943,675 filed 4 Dec. 2019, each of which is incorporated in its entirety by this reference.

TECHNICAL FIELD

This invention relates generally to the sintering field, and more specifically to a new and useful system and method in the sintering field.

BACKGROUND

Sintering, the process of heating a material (typically a metal powder, slurry, paste, etc.) until it coalesces into a solid and/or porous mass preferably without melting the material, traditionally requires heating the materials in a furnace with a high gas purity. The presence of oxidizing agents (such as oxygen ($O_2$), water ($H_2O$), carbon dioxide (CO2), etc.) in the furnace can lead to undesirable oxidation of the sintered materials, negatively effecting properties of the sintered materials. Thus, there is a need in the sintering field to create a new and useful system and method. This invention provides such new and useful system and method.

BRIEF DESCRIPTION OF THE FIGURES

FIGS. 7C and 7D are isometric views of a cut-out from the front and back, respectively, of an example of a retort.

FIG. 8 is a schematic representation of an embodiment of a method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
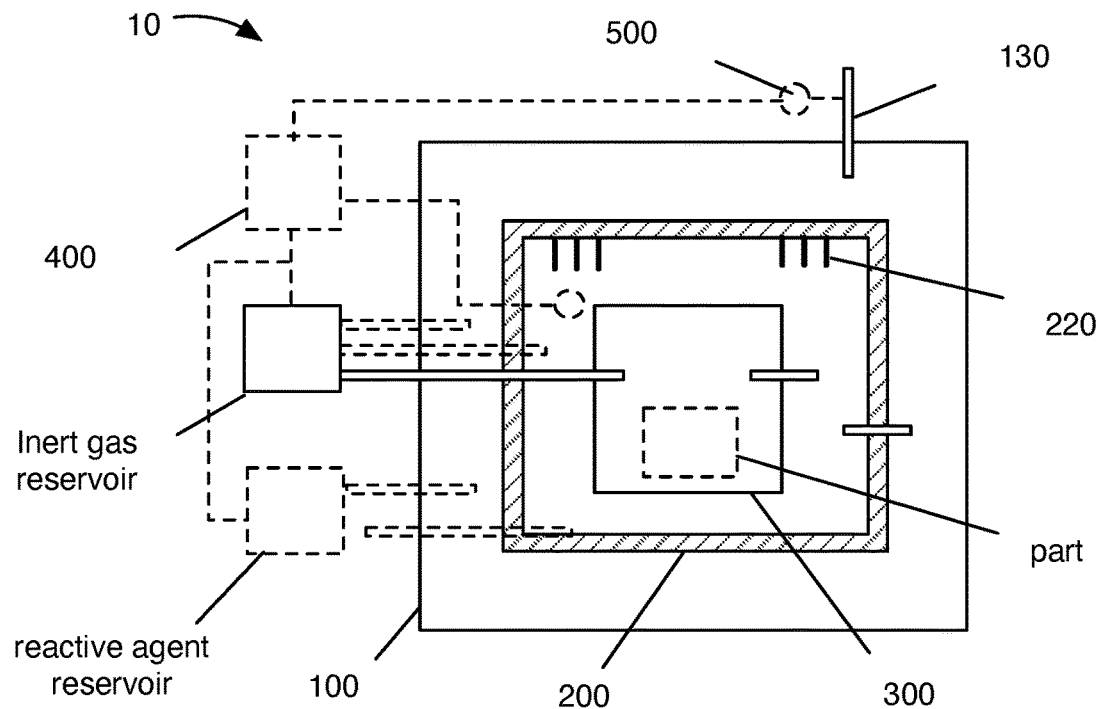
FIG. 1 is a schematic representation of a variant of the system.

As shown in FIG. 1, the system 10 preferably includes an outer shell, an insulation chamber, and a retort. The system can optionally include a computing system, one or more sensors, and/or any suitable components. The outer shell can define a volume (e.g., an outer chamber volume, a furnace volume, etc.). The system can function to reach and maintain a high temperature (e.g., up to 1400° C.) for any suitable duration of time (e.g., sintering time such as 10 min, 30 min, 1 hour, 2 hour, 4 hour, 8 hour, 24 hour, etc.), to support a part (e.g., printed metal part, green body, brown body, part precursor, finished part, etc.), and/or can perform any suitable function. The system is preferably a vacuum furnace; however, can additionally and/or alternatively be an atmosphere furnace, or can utilize any other atmosphere control scheme. The component geometry of the furnace can be what is commonly described as a muffle furnace, a retort furnace, a tube furnace, and/or any suitable configuration of heating elements, atmosphere control, and insulation that is known as a furnace.

In specific examples, the system 10 can be used to sinter (e.g., frittage) one or more parts (e.g., a green body such as a printed part with solvent removed; a brown part such as a printed part with binder removed; etc.), and/or any suitable materials (e.g., a metal powder, metal paste, etc.). However, the system can additionally or alternatively be used to heat, bake, and/or process any suitable material(s) at high temperature and/or in any suitable atmosphere and/or at any suitable pressure.

2. Benefits

Variations of the technology can confer several benefits and/or advantages.

First, variants of the technology can enable material(s) (e.g., green bodies; brown bodies; powdered metals; part precursors; object precursors; printed parts such as parts described in U.S. application Ser. No. 16/744,657, filed 16 Jan. 2020 "entitled SYSTEM AND METHOD FOR ADDITIVE METAL MANUFACTURING" which is incorporated in its entirety by this reference; etc.) to be heated to high temperatures to sinter the materials. Specific examples of the technology can enable any suitable temperature (e.g., up to 1400° C.) to be maintained for any suitable duration of time to sinter the material(s).

Second, variants of the technology can enable the furnace to self-clean (e.g., prevent and/or remove build-up of byproducts of the sintering process such as volatile compounds, carbonaceous compounds, organic compounds, etc.) before, during, or after sintering operations. In specific examples, the insulation can controllably (e.g., by its structure, by chemical makeup, by flow control systems, etc.) retain moisture, $O_2$, and/or any suitable oxidizing agent that can react with the byproducts, producing products (e.g., carbon monoxide, carbon dioxide, etc.) that can be readily removed from the system (e.g., atmosphere exchanger, vacuum pump, vent, etc.). In other examples, the furnace can controllably inject moisture, $O_2$, and/or any suitable oxidizing and/or reducing agent into a specific area of the furnace so as to react with byproducts solely in that area.

Third, variants of the technology can provide a sintering environment (e.g., inert environment; clean environment such as containing <1 ppm, <10 ppm, <100 ppm, <1000 ppm, etc. reactive agents; etc.) for the sintering of materials. Examples of the technology can enable this sintering environment by controlling inert gas flow through the system (e.g., the flow path, flow rate, temperature, etc.), the choice of material for the retort (e.g., graphite), the choice of inert gas for the environment, and/or as a result of any suitable system and/or component properties. In specific examples, the flow path can be defined by producing a positive pressure (e.g., introducing gas) inside the retort while producing a reduced or lower pressure (e.g., vent or vacuum, pressure lower than a retort pressure, etc.) in the outer chamber volume.

Fourth, variants of the technology can enable a graphite (additionally or alternatively silicon carbide, high temperature steel, nickel superalloy, molybdenum alloy, or other high temperature oxidation resistant material) retort to be used (and reused) in a ceramic insulation chamber, thereby conferring a lower-cost, higher-efficiency hybridized furnace. In specific examples, the arrangement of the components within the system, the material selection, and/or the operation parameters (e.g., gas flow rate, gas identity, etc.) can enable the graphite retort to be non-destructively used with the ceramic insulator. However, combining the graphite retort with the ceramic insulator can be enabled in any suitable manner.

Fifth, variants of the technology can help to avoid (e.g., minimize, prevent, etc.) build-up of solid and/or liquid byproducts within the system. In specific examples, by introducing reactive agents (e.g., oxidizing agents, reducing agents, water, oxygen, air, etc.) into the retort, outer chamber, or insulation chamber, byproducts from heating and sintering the green body can be reacted to form volatile products, such as $CO$, $CO_2$, $CH_4$, which can be exhausted out of the system. In specific examples, the reactive agents can be introduced by: desorption from the insulator (e.g., wherein the insulator has sorbed oxidizing agents), intentional mixing of reactive agents into the system (e.g., adding reactive agents to the gas inlet of the retort, a gas inlet of the insulation chamber, and/or a gas inlet into the outer chamber, etc.), addition of controlled amounts of oxidant forming materials (oxygen containing organic materials or inorganic compounds), and/or otherwise introduced.

Sixth, variants of the technology can help to control the concentration and/or location of where reactive agents can be found. In specific examples, controlled amounts of reactive agent can enter the retort or the insulation chamber or the outer chamber. The amount and/or identity of the reactive agents can be such that the reactive agents preferably react with sintering byproducts instead of the parts themselves.

However, variants of the technology can confer any other suitable benefits and/or advantages.

3. System

The system 10 preferably includes an outer shell, an insulation chamber, and a retort. The system can optionally include a computing system, one or more sensors, and/or any suitable components. The system can function to reach and maintain a high temperature (e.g., up to 1400° C.) for any suitable duration of time (e.g., sintering time such as 10 min, 30 min, 1 hour, 2 hour, 4 hour, 8 hour, 24 hour, etc.), to support a part (e.g., printed metal part, green body, brown body, finished part, etc.), and/or can perform any suitable function.

3.1 Outer Shell

The outer shell 100 preferably functions to define a volume (e.g., an outer chamber, chamber volume, etc.) that can maintain a controlled environment (e.g., atmosphere such as pressure, composition, etc. such as to separate the environment inside the outer shell from the environment outside the outer shell).

The outer shell 100 can maintain a positive or negative pressure within the chamber volume. The pressure inside the chamber is preferably controlled to any suitable value and/or range thereof between $10^{-5}$ and 800 Torr such as 700 Torr; however, any suitable pressure can be used. In a set of specific examples, the pressure inside the outer chamber can be 10-800 Torr, 10-100 Torr, 10-70 Torr, 30-50 Torr, 30-70 Torr, 500-800 Torr, 600-700 Torr, and/or any suitable pressure.

The temperature within the outer chamber is preferably less than the temperature of the insulation chamber interior (e.g., insulation chamber volume, insulation chamber cavity, insulation chamber), but can additionally or alternatively be equal to or higher than the insulation chamber interior temperature. The temperature differential is preferably a value or range thereof between 100-1200° C. such as 300-1000° C., but can otherwise vary. In specific examples, the temperature differential is between 200-400° C. to prevent decay of electrical contacts (e.g., aluminum contacts). However, any suitable temperature differential can be established.

The outer shell 100 is preferably airtight (e.g., form a hermetic seal when closed), but can additionally or alternatively be waterproof, liquid permeable, fluid permeable, or otherwise configured. The outer shell 100 preferably surrounds the insulation chamber 200; however, additionally or alternatively, the insulation chamber can share one or more walls with the outer shell (such as sharing a common door, sharing common walls, etc.), or be otherwise configured. The outer shell can be constructed from a single piece of material (e.g., welded material), multiple pieces of material (e.g., fastened together), and/or can be constructed in any suitable manner. The outer shell material can include: stainless steel, superalloys, titanium, molybdenum, lanthanated molybdenum, carbon steel, and/or any any other suitable material. The outer shell shape is preferably cylindrical; however, the outer shell can be prismatoid (e.g., rectangular prism, cubic, etc.), spherical, and/or have any suitable shape.

The outer shell 100 preferably includes a door 110; one or more gas ports 120; one or more exhaust mechanisms 130; optionally, a cooling system 140; and/or any suitable components.

The outer shell door 110 preferably provides access to the outer shell (e.g., to insert part, to remove parts, etc.). The outer shell door is preferably on a face of the vacuum chamber; however, the vacuum chamber door can be on the side and/or arranged in any suitable manner. The outer shell door can be on hinges, tracks, rails, and/or can be opened in any suitable manner. For some embodiments, the outer shell door preferably includes a sealant 115. The sealant preferably functions to isolate the environment inside the outer shell from the environment outside the outer shell. The sealant is preferably an O-ring or a gasket; however, the sealant can additionally and/or alternatively be chemical (e.g., vacuum grease), mechanical (e.g., threaded screw such as wrapped with Teflon™ tape), and/or any suitable sealant can be used.

The one or more gas ports 120 preferably function to allow gases to be introduced into the outer shell. Alternatively, the outer shell can include no gas ports (e.g., wherein gas can be introduced to the chamber via the door before door closure or after door opening). The gas port(s) are preferably arranged on the wall of the outer shell opposing the door; however, the gas port(s) can be arranged on the door, on the bottom of the outer shell, on the top of the outer shell, in the side of the outer shell, and/or arranged at any suitable location on the outer shell. In variants with more than one gas port, each gas port can correspond to a different gas; however, each gas port can correspond to a given type of gas, mixture of gas, and/or can correspond to any suitable gas(es). The gas port(s) can be used to introduce one or more inert gases (e.g., nitrogen ($N_2$), helium (He), neon (Ne), argon (Ar), krypton (Kr), etc. and/or combinations thereof); forming gas (e.g., hydrogen gas ($H_2$) such as in a concentration and/or range thereof between 1% and 99%, the remainder being an inert gas), reactive agents (e.g., oxidizing agents such as $O_2$, ozone ($O_3$), nitrous oxide such as dinitrogen monoxide ($N_2O$) and dinitrogen tetroxide ($N_2O_4$), fluorine ($F_2$), chlorine ($Cl_2$), bromine ($Br_2$), iodine ($I_2$), water, hydrogen peroxide ($H_2O_2$), carbon dioxide ($CO_2$), etc.; reducing agents such as ammonia ($NH_3$), hydrogen ($H_2$), sulfur dioxide ($SO_2$), carbon monoxide (CO), etc.; air; synthetic air; and/or combinations thereof), and/or any suitable gas. Each type of gas preferably corresponds to a different gas port (e.g., an inert gas port, a forming gas port, a reactive agent port). However, two or more gases can be introduced via the same port. The concentration of reactive agents (e.g., total concentration in the furnace volume or subvolume, concentration of reactive agent introduced, etc.) can be any suitable concentration and/or range thereof between 1-1000 ppm; however, any concentration of reactive agents can be used. In a series of examples, the concentration of reactive agent (e.g., within the internal volume, intermediary volume, outer volume, retort volume, injected into the furnace, etc.) can be 1-5 ppm, 1-10 ppm, 5-20 ppm, 10-100 ppm, 30-70 ppm, 50-500 ppm, 100-200 ppm, 100-1000 ppm, and/or any suitable concentration can be used. The reactive agent concentration is preferably different in different volumes (e.g., lower concentration in the retort volume than the outer chamber volume, insulation volume, etc.), but can be the in each volume.

To achieve the reactive agent concentration, reactive agents can be introduced pure (e.g., 95%, 97.5%, 99%, 99.5%, 99.9%, 99.99%, 99.998%, 99.999%, 100%, etc.) and/or with one or more carrier gas. The carrier gas is preferably an inert gas and/or mixture of inert gases but can include reactive agents, air, and/or any suitable material. When a carrier gas is included, the concentration of reactive agent can be any value or range between about 0.01% to 95% by mass and/or by volume such as 0.05%, 0.1%, 0.5%, 1%, 2%, 3%, 5%, 10%, 20%, 30%, 50%, 75% where the remainder of the introduced gas including a carrier gas. When a plurality of reactive agents is introduced, each reactive agent can have the same or different concentration. However, the reactive agent concentration can be less than 0.01% or greater than 95%. In a first illustrative example, the introduced gas can include air (e.g., zero air; pure air; industrial air; a gas mixture including approximately 78% nitrogen, approximately 21% oxygen, approximately 1% argon, and/or trace amounts of other gases; a gas mixture including approximately 71% nitrogen, approximately 21% oxygen, approximately 7% water, approximately 1% argon, and/or trace amounts of other gases; air with a humidity between 0% and 100%; etc.). In a second illustrative example, the introduced gas can include 1% water and 99% inert gas (e.g., nitrogen, argon, neon, etc.). In a third illustrative example, the introduced gas can include 1% oxygen and 99% inert gas. In a fourth illustrative example, the introduced gas can include 100% oxygen. However, the reactive agent can be introduced in any manner.

Properties of the reactive agents (e.g., flow rate, pressure, concentration, identity, timing, etc.) can be determined based on a sensor reading, based on a look-up table (e.g., relating a part property and a reactive agent property), a mass balance (e.g., a mass balance of the estimated or predicted amount of sintering byproduct and the amount of reactive agent to react with the sintering byproduct), heuristically, empirically, based on a model, based on a part property, and/or otherwise be determined.

The gas flow rate (e.g., maximum gas flow rate, average gas flow rate, median gas flow rate, etc.) into and/or within the outer chamber can be any suitable value and/or range thereof between 0.1 to 550 L/min; however, any suitable gas flow rate can be used. The gas flow rate can be a volume flow rate, a mass flow rate, and/or any suitable flow rate. In a series of examples, the gas flow can be 0.1-1, 1-2, 2-5, 1-10, 5-10, 5-15, 10-20, 10-50, 25-100, 75-200, 200-300, 100-500, 300-550 L/min, values therebetween, less than 0.1 L/min, or greater than 550 L/min. The gas flow rate into the chamber is preferably less than the gas flow rate into the retort. For example, the gas flow rate into the chamber volume (e.g., insulation chamber volume and/or outer chamber volume) can be between about 0.1% and 20%, such as 0.1%-0.5%, 0.2%-1%, 0.5%-2.5%, 1%-5%, 2%-10%, 10%-20%, 5%-20%, of the value of the gas flow rate into the retort volume. However, the gas flow rate into the chamber volume can be greater than the flow rate into the retort volume (e.g., greater than 100% of the gas flow rate into the retort), greater than 20% of the gas flow rate into the retort, or less than 0.1% of the gas flow rate in the retort (for instance, the gas flow rate into the chamber volume can be 0 L/min, while gas be flowed into the retort volume). However, the gas flow rate can be the same as the gas flow rate into the retort and/or greater than the gas flow rate into the retort.

The gas flow rate can follow a gas flow rate profile (e.g., a relationship between gas flow rate and time). The gas flow rate profile can be constant, a box profile, a triangle profile, a functional profile (e.g., polynomial function, exponential function, logarithmic profile, sinusoidal profile, sigmoidal profile, etc.), a step profile, and/or have any suitable profile. In variants, the gas flow can vary throughout the operation of the furnace. The gas flow can vary continuously, in discrete steps (e.g., steps lasting from 1 min, 5 min, 10 min, 20 min, 30 min, 1 hour, 2 hours, 5 hours, 10 hours, etc.), and/or the gas flow can vary in any suitable manner. The gas flow can vary depending on an operation parameter of the furnace (e.g., a temperature, an operation step, etc.), gas to be introduced (e.g., inert gas, forming gas, reactive agents, etc.), a part or part precursor property, a sintering byproduct (e.g., concentration, identity, etc.), a gas flow in another part of the furnace (e.g., retort gas flow rate), and/or otherwise vary.

Figure 10A:
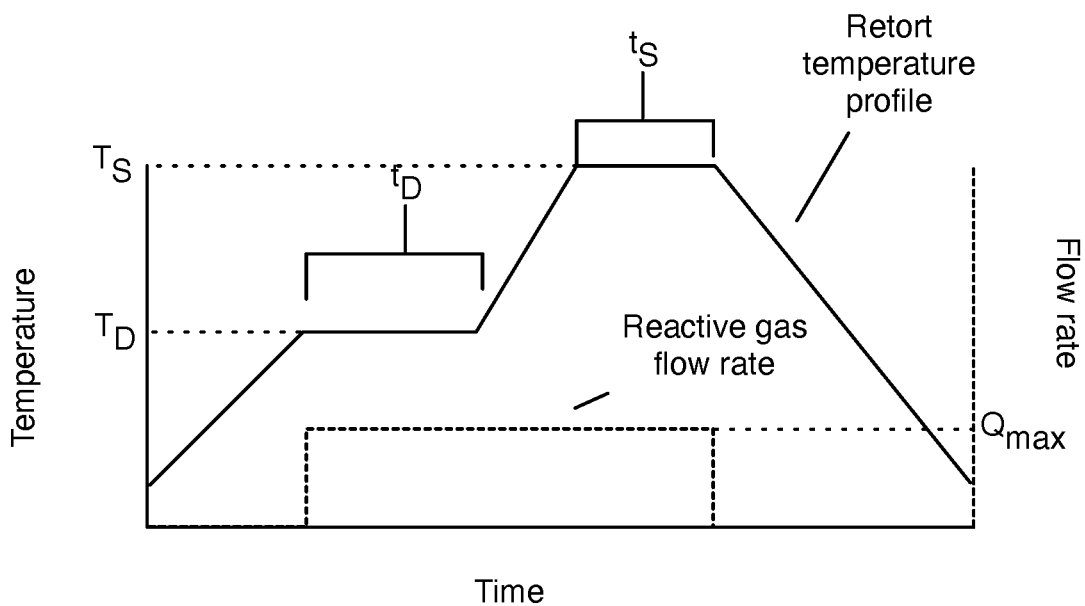
FIGS. 10A, 10B, and 10C are schematic representations of examples of retort temperature profiles and reactive gas flow rate profiles, where $T_D$ is a debinding temperature, $T_S$ is a sintering temperature, $t_D$ is a debinding time, $t_S$ is a sintering time, and $Q_{max}$ is a maximum reactive gas flow rate.
Figure 10B:
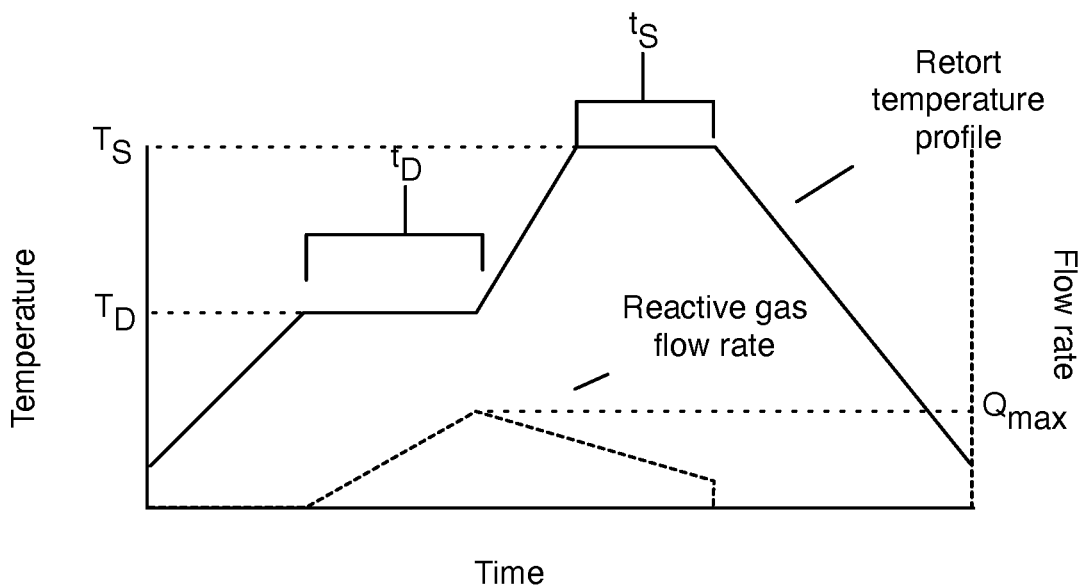
Figure 10C:
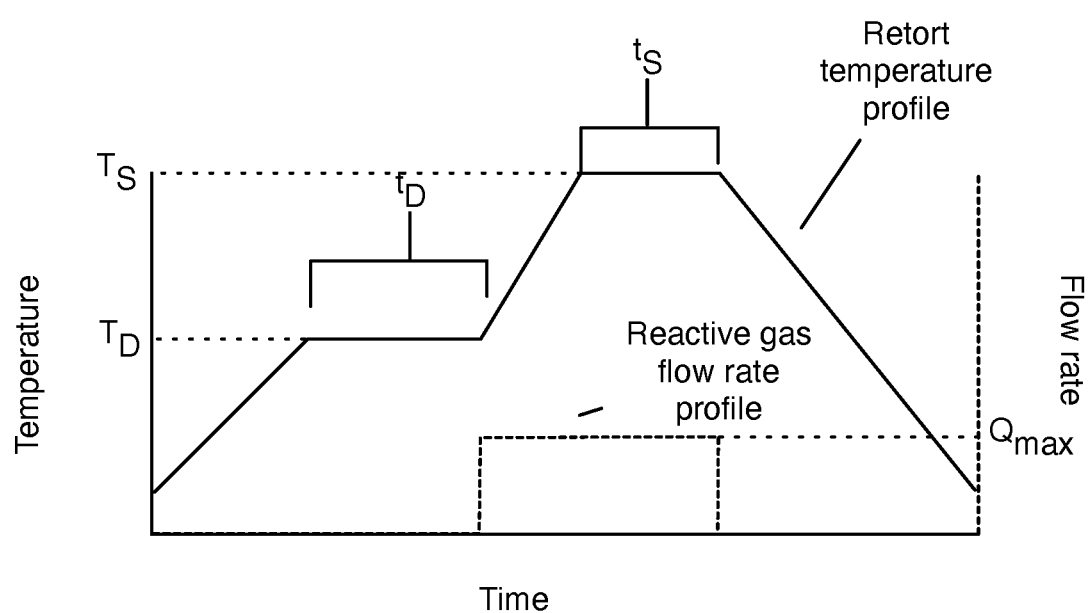

In a first specific example, as shown in FIG. 10A, a flow rate for a gas (e.g., including a reactive agent) can be initiated when the retort or insulation chamber reaches a debinding temperature. The flow rate can remain substantially constant (e.g., vary by less than about 0.1%, 1%, 2%, 5%, 10%, 20%, etc.) until the part precursor has been sintered (e.g., the retort and/or insulation chamber has been at a sintering temperature for a sintering time). In a second specific example, as shown in FIG. 10B, a flow rate for a gas (e.g., including a reactive agent) can be initiated when the retort or insulation chamber reaches a debinding temperature. The flow rate can ramp up to a maximum flow rate (e.g., $Q_{max}$) when the retort and/or insulation chamber reaches a sintering temperature, thereafter decreasing (continuously or discontinuously) to no flow rate after a sintering time has elapsed. In a third specific example, as shown in FIG. 10C, a flow rate for a gas (e.g., including a reactive agent) can be initiated after part precursor debinding (e.g., after the retort or insulation chamber has been at a debinding temperature for a debinding time). The flow rate can remain substantially constant (e.g., vary by less than about 0.1%, 1%, 2%, 5%, 10%, 20%, etc.) until the part precursor has been sintered (e.g., the retort and/or insulation chamber has been at a sintering temperature for a sintering time). However, the flow rate can otherwise vary.

The gases flowed during these steps can be any suitable mixture of inert gases, reactive agents, and/or any suitable gases. In a first example, the gas flowed during a step can be 100% inert gas. In a second example, the gas flowed can be a mixture of inert gas and reactive agents. In this specific example, the concentration of reactive gas can be any suitable value and/or range between 1-1000 ppm; however, any concentration of reactive gas can be used. The gas flow rates during each step can be any suitable value and/or range thereof between 0.1-50 L/min, such as 1-2, 2-5, 1-10, 5-10, 5-15, 10-20 L/min; however, any suitable flow rate can be used.

In a first specific example, the outer shell can include an inert gas port and a reactive agent port (e.g., oxidizing agent port, reducing agent port, etc.). In this specific example, the inert gas can provide 100% inert gas to the outer chamber environment and the reactive agent port can provide 100% reactive agent (e.g., pure reactive agent, reactive agent with a carrier gas, etc.) to the outer chamber environment. The composition of the outer shell environment (e.g., percentage reactive agent, percentage inert gas, percentage reactive agent, etc.) can be controlled by varying the gas parameters (e.g., flow rate, pressure, temperature, etc.). In this specific example, the inert gas and reactive agent can mix in the outer shell environment. In a second specific example, the gases (e.g., inert gas and reactive agent) can be mixed (e.g., to a desired concentration) prior to introduction into outer chamber environment (e.g., in a gas cylinder, in a gas line, etc.). In this specific example, the outer shell can have a single gas port. However, additionally and/or alternatively, the outer shell can have any suitable number of gas ports and gas ports can introduce any suitable gas(es) into the outer chamber.

The one or more exhaust mechanisms 130 functions to exhaust the outer chamber and/or other chambers contained therein. The exhaust mechanism(s) can be arranged on the wall of the outer shell opposing the door, on the door, on the bottom of the outer shell, on the top of the outer shell, in the side of the outer shell, and/or arranged at any suitable location on the outer shell. In one variation, the exhaust mechanism includes an exhaust port (e.g., a vent), wherein positive pressure within the outer chamber exhausts gases from the outer chamber. In a second variation, the exhaust mechanism includes a vacuum mechanism, which functions to produce a vacuum (e.g., reduce the pressure) within the outer chamber (e.g., by removing air from inside the outer chamber) and/or apply negative pressure to the outer chamber. The vacuum mechanism is preferably a vacuum pump 135; however, any suitable vacuum mechanism can be used. The vacuum mechanism preferably includes a vacuum gauge.

In variants, sintering byproducts are substantially degraded (e.g., 50%, 60%, 70%, 75%, 80%, 90%, 95%, 97.5%, 99%, 99.9%, 99.99%, 100%, etc. of sintering byproducts are removed; sintering byproducts are fully oxidized; etc.) by reactive agents within the chamber volume. As a result, in examples of these variants the exhaust mechanism is not connected or coupled to a byproduct recovery mechanism and the environment from the chamber volume is vented directly to the environment surrounding the system. In alternative variants, the exhaust mechanism can optionally be coupled to a byproduct recovery mechanism (e.g., scrubber such as catalytic converter, sorption filter, etc.; precipitator such as a condenser, a cold finger, cold trap, etc.; etc.). The byproduct recovery mechanism can function to remove and/or collect volatile products and/or byproducts (e.g., sintering byproducts, oxidized sintering byproducts, $CO$, $CO_2$, etc.) from the removed atmosphere. The byproduct recovery mechanism can be arranged within the exhaust mechanism, outside of the outer shell, within the outer shell (e.g., between the shell and the insulation chamber), or otherwise arranged. In a specific example, the exhaust mechanism can be coupled to an atmosphere exchanger, wherein the atmosphere exchanger can be configured to remove and replace (e.g., with a cleaned atmosphere; with a different atmosphere such as containing a different composition; with a cooler atmosphere such as at a lower temperature than that inside the outer chamber, insulation chamber, retort, etc.; etc.) the outer chamber atmosphere. However, the exhaust mechanism can be arranged in any suitable manner.

In specific embodiments, the pressure of the outer chamber (e.g., controlled by the exhaust mechanism or the gas inlet) can be used to control the rate and/or extent of reaction of one or more byproducts from sintering (e.g., volatile byproducts, carbonaceous byproducts, organic byproducts, etc.). In a first variant, operating the system at higher pressures (e.g., closer to atmospheric pressure, greater than or equal to atmospheric pressure, etc.) can lead to more diffusive air flow within the outer chamber. The greater diffusive air flow can enhance the reaction (e.g., efficiency) of the byproducts (e.g., using reactive agents charged into the retort, into the outer chamber, into the insulation, by reactive agent(s) adsorbed by the insulation, by oxidizing specie(s) desorbed from the insulation, etc.) by increasing the probability for the reactive agent(s) to interact with the sintering byproducts (e.g., by increasing the residency time of byproducts and/or reactive agents within the insulation chamber, outer chamber, etc.). In a second variant, operating the outer chamber at a lower pressure (e.g., less than atmospheric pressure), can increase the desorption of sintering byproducts (e.g., carbonaceous species) and/or reactive agents from one or more surface (e.g., from the retort, from the part, from the insulation, from the outer chamber, etc.). In both of these embodiments, oxidizing the byproducts can facilitate the removal of the byproducts at substantially the same time as sintering the part. In a set of examples, during operation, the system can function at higher pressures (e.g., near atmospheric pressure, greater than or equal to atmospheric pressure), lower pressures (e.g., less than atmospheric pressure), and/or alternate between higher and lower pressure. However, the pressure of the outer chamber environment can be controlled in any suitable manner.

In variants including a cooling system 140, the cooling system preferably functions to cool the outer chamber (e.g., the outer shell walls, outer chamber environment, etc.), for example to provide safety for users in the event of touching the system during use. The cooling system can be bolted to the side of the outer shell, attached through penetrations in the outer shell, include running coolant(s) (such as air, water, glycerol, etc.) through the outer shell walls, and/or can be arranged in any suitable manner.

3.2 Insulation Chamber

The insulation chamber 200 preferably functions to support and heat (e.g., sinter) a part and/or part precursor. The insulation chamber is preferably arranged inside the outer shell; however, the insulation chamber can share one or more surfaces (e.g., walls, doors, etc.) with the outer shell, or be arranged in any suitable manner.

The insulation chamber can define an insulation chamber volume. The insulation chamber volume can be fluidly coupled to the outer chamber volume, fluidly coupled to the retort volume, isolated from the outer chamber volume, isolated from the retort volume and/or be otherwise coupled to the outer chamber volume and/or retort volume. In some variants, the insulation chamber volume and outer chamber volume can refer to the same volume (e.g., the insulation chamber volume and outer chamber volume are in fluid communication, insulation chamber volume and outer chamber volume share a common environment, etc.). However, the insulation chamber volume and outer chamber volume can be distinct volumes and/or otherwise be related.

The insulation chamber volume can be isotropic (e.g., spherical, cubic, etc.) and/or anisotropic (e.g., rectangular prism, truncated pyramid, cylinder, etc.). In specific examples, the insulation chamber volume can be any suitable value and/or range thereof between 512 in$^3$ and 8000 in$^3$; however, any suitable volume can be used. In a specific example, the insulation chamber volume can be a prismatoid, where each dimension (e.g., length, width, height) can be independently chosen to be any value and/or range thereof between 8 and 20 in; however, any suitable material size can be chosen. In a second specific example, the insulation chamber volume can fill 1%, 5%, 10%, 20%, 30%, 50%, 75%, 90%, and/or any suitable fraction of the outer chamber volume.

In a specific example, during operation of the furnace (e.g., during heating, while a temperature is maintained, during sintering, during debinding, during temperature ramp up, when one or more gas is flowing in one or more volume defined within the furnace, etc.), the insulation chamber volume is preferably in substantially unidirectional fluid communication with the retort volume such that fluid from the retort volume can enter the insulation chamber volume but fluid from the insulation chamber volume does not enter the retort volume. The unidirectional fluid communication can be enabled by a pressure differential (e.g., greater pressure within the retort volume, lower pressure in the insulation chamber volume), a flow differential (higher flow rate in the retort volume, lower flow rate in the insulation chamber volume, etc.), a barrier (e.g., semipermeable barrier, osmosis, etc.), and/or otherwise be enabled. However, the unidirectional fluid communication can be such that the fluid from the insulation chamber volume can enter the retort volume but fluid from the retort volume does not enter the insulation chamber volume, the insulation chamber volume and the retort chamber volume can be in bidirectional fluid communication, the insulation chamber volume and the retort chamber volume can be fluidly disconnected from each other, and/or the insulation chamber volume and retort volume can be otherwise in communication.

The insulation chamber preferably maintains a positive internal pressure, but can additionally or alternatively maintain a negative internal pressure, be equilibrated with the outer chamber, be equilibrated with an external source, or maintain any other suitable pressure. Alternatively, the insulation chamber pressure can be dynamically adjusted (e.g., based on the ratio of waste compounds such as sintering byproducts in an insulation chamber exhaust stream) or otherwise controlled.

The insulation chamber preferably maintains a constant internal temperature, but can additionally or alternatively maintain a variable internal temperature or any other suitable temperature. The insulation chamber temperature can be between 100° C. and 1400° C. such as 1200° C., or be any other suitable temperature. The temperature is preferably substantially uniform within the insulation chamber volume, but can additionally or alternatively vary within the insulation chamber volume (e.g., based on radiation component placement, gas flow patterns, etc.).

The insulation chamber preferably includes an insulation chamber housing 210, one or more heating elements 220, insulation 230, and/or any suitable components.

The insulation chamber housing 210 preferably functions to support (e.g., raises, lifts, etc.) the insulation chamber off the bottom of the outer shell (e.g., using a base, legs, rails, etc.); however, the insulation chamber housing can be in contact with the bottom of the outer shell, and/or be otherwise suitably arranged. The insulation chamber housing is preferably thermally insulated from the outer shell (e.g., by an air gap, filled with one or more insulators, etc.); however, the insulation chamber housing can be in thermal contact with the outer shell. The insulation chamber housing 210 is preferably made of stainless steel; however, the insulation chamber housing can be made of any suitable material. The insulation chamber housing preferably includes one or more vents 215 (e.g., adjacent to the heating elements); however, the insulation chamber housing can be arranged in any suitable manner. The insulation chamber housing preferably includes a door, wherein the insulation chamber opening (e.g., when the door is open) is preferably parallel to the open axis defined by the outer shell (e.g., the insulation chamber door is aligned with the outer shell door); however, the insulation chamber opening can be coextensive with the outer shell door and/or arranged in any suitable manner.

Figure 6:
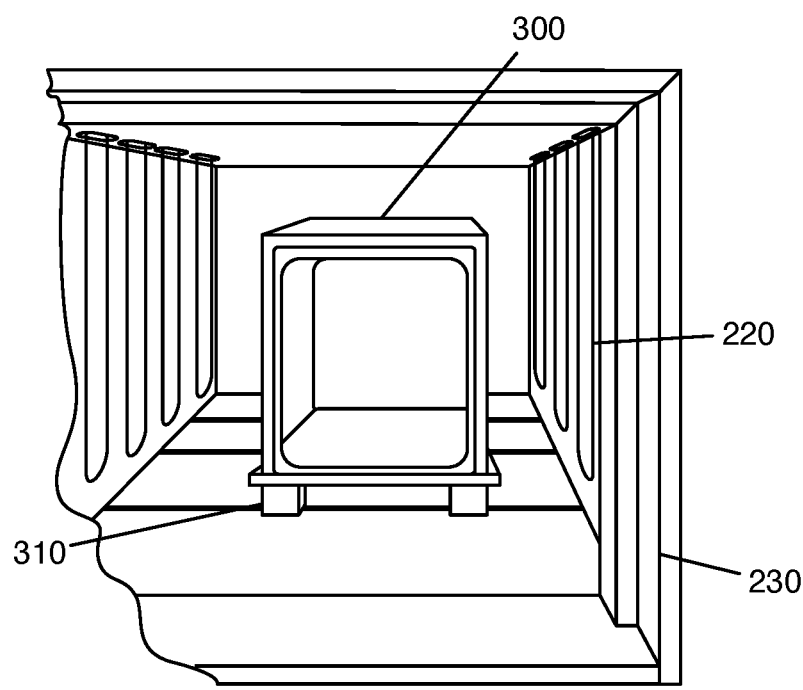
FIG. 6 is a schematic representation of an embodiment of the heating elements relative to the retort within the insulation chamber.

The heating elements 220 preferably function to heat the insulation chamber interior (e.g., to a sintering temperature). As shown for example in FIG. 6, the heating elements are preferably arranged (e.g., suspended) from the top of the insulation chamber housing (e.g., to mitigate the risk of the heating elements contacting any other system component and/or part introduced into the insulation chamber); however, the heating elements can be arranged along the sides and/or bottom of the insulation chamber, or be arranged in any suitable location. The heating elements are preferably made of a material that can be heated in atmosphere (e.g., in the presence of $O_2$, $H_2O$, etc.) such as molybdenum disilicide ($MoSi_2$), silicon carbide (SiC), and/or any suitable material. Alternatively, the heating elements can be made of a material that is preferably not heated in atmosphere (e.g., graphite, molybdenum (Mo), tungsten (W), etc.); and/or any other suitable material(s). The heating elements can preferably heat the insulation chamber to any temperature and/or range thereof between 100° C. and 1450° C. such as 1200° C., 1300-1400° C., 1250-1450° C.; however, the heating elements can heat the insulation chamber to any suitable temperature. The ramp rate (e.g., rate of change of the temperature of the insulation chamber and/or heating elements) can be any value and/or range thereof between 0.5-100° C./min; however, any suitable ramp rate can be used. In a series of specific examples, the ramp rate can be 0.5-1, 1-5, 1-10, 5-20, 10-50, 10-100, 30-70° C./min. The ramp rate can vary continuously, discretely (e.g., stepwise such as in steps that vary by 5-10° C.), according to a programmed control rate, in response to a feedback loop and/or in any suitable manner. However, the ramp rate can be constant, and/or any suitable ramp rate can be used.

In variants, the temperature (of the insulation chamber and/or the retort) can have values according to a temperature profile (e.g., a relationship between temperature and time). The temperature profile can include one or more temperature steps, where each temperature step is maintained for a predetermined amount of time. Between steps, the temperature profile can be increased or decreased at a substantially constant rate and/or at a varying rate. The rate of change of the temperature profile (e.g., ramp rate, cooling rate) can be the same or different between temperature steps. In an illustrative example, as shown in FIGS. 10A-10C, the temperature profile can ramp up the temperature to a debinding temperature which is maintained for a debinding time then ramp up the temperature to a sintering temperature for a sintering time followed by cooling the insulation chamber and/or the retort. The sintering time and debinding time can be the same or different and each can be any duration of time. In a second illustrative example, the temperature can increase at a first ramp rate until a threshold temperature is reached and then increase at a second ramp rate that is lower than the first ramp rate to the sintering temperature. In a third illustrative example, the temperature can increase at a constant rate until a sintering temperature is achieved. However, any temperature profile can be followed.

The insulation 230 preferably functions to thermally insulate the insulation chamber (e.g., retain heat inside the insulation chamber, minimize the heat leakage into the environment around the insulation chamber, etc.). The insulation is preferably on one or more inner surfaces of the insulation chamber (e.g., line the top, bottom, sides, door, and/or any other suitable inner insulation chamber surface); however, insulation can be on the outer surface of the insulation chamber, and/or arranged in any suitable manner. The insulation is preferably a ceramic material (e.g., fibrous alumina, firebrick, alumina, zirconia, mullite, carbon-fiber-composite, rigid graphite board, bubble alumina, alumina cement, etc.); however, any suitable insulation material can be used. In a specific example, the insulation can be made of bubble alumina (e.g., Zerodur®); however, the insulation can be any suitable material. The ceramic material preferably releases a low dose of reactive agents (e.g., less reactive agents than is actively provided through a gas port; an amount of reactive agents such that the concentration of reactive agents within the insulation chamber and/or outer chamber is less than 1 ppm, 10 ppm, 100 ppm, 1000 ppm, etc.; etc.), but can release any amount of reactive agents. The ceramic material can release the reactive agents responsive to a temperature of the system, a pressure of the system, an environment of the system, a humidity of the system, and/or otherwise release the reactive agents.

The insulation is preferably substantially uniformly thick (e.g., approximately the same thickness relative to the insulation chamber housing, approximately the same thickness along one or more axes normal to the insulation chamber housing, etc.). In a first specific example, the insulation thickness can be any value and/or range thereof between 1 and 6 in; however, any suitable thickness can be used. In a second specific example, the insulation thickness can fill 1%, 5%, 10%, 20%, 30%, 50%, 75%, 90%, 95%, and/or any suitable fraction and/or percentage of the insulation chamber and/or the outer chamber volume. The insulation thickness can depend on the outer chamber (e.g., size, volume), the temperature differential (e.g., temperature gradient, target temperature gradient, such as between the insulation chamber and the outer chamber), the insulation material, temperature uniformity (e.g., target temperature uniformity), and/or on any suitable properties.

In some embodiments, the insulation can function to provide a reactive environment (e.g., locally reactive environment such as inside the insulation, adjacent to the insulation, etc.; for example, by desorbing water, oxygen, and/or other reactive agents) or provide the reactive agents. For example, the insulation can sorb (e.g., adsorbs, absorbs, etc.) reactive agents (e.g., $O_2$, $H_2O$, etc.) from the atmosphere (e.g., during part loading, during intentional reactive agent introduction, during a reloading time period wherein the insulation can be exposed to reactive agents, etc.); however, the insulation can react (e.g., decompose at high temperatures such as the sintering temperature) to produce reactive agents, and/or can act as a source of reactive agents in any suitable manner. However, the reactive agents can be supplied from an external source (e.g., selectively supplied to the insulation chamber cavity from an external reservoir), can be introduced during system setup (e.g., placed within the insulation chamber cavity, wherein the reactive agents can sublime, evaporate, or be otherwise distributed throughout the insulation chamber cavity), can be released (e.g., desorb) from a reactive agent-trapping species (e.g., zeolite, molecular sieve, sealed container, etc.), or be otherwise provided to the system.

In some embodiments, the insulation (e.g., insulation chamber) can include one or more gas ports 240. The gas ports can function to allow gas(es) (e.g., inert gas, reactive agents, forming gas, etc.) to be introduced into and/or removed from the insulation chamber. The gas can be the same or different from that provided to the outer chamber, retort, and/or any other suitable chamber. In a series of examples, the gas ports can be holes, vents, feedthroughs, and/or have any suitable configuration and couple the insulation chamber environment to: the outer chamber, gas supplies (e.g., gas cylinders, gas volumes, etc.), the retort environment, the exhaust mechanism, and/or any suitable atmosphere. In some variants, the gas flow within the insulation chamber can pass over or proximal to the heating elements which can help prevent sintering byproducts from building up on or reacting with the heating elements. The insulation chamber gas ports can be the same as and/or different from the outer chamber gas ports and/or the retort gas ports. The environment within the insulation chamber can substantially identical (e.g., sharing a common environment; reactive agents and/or other gas concentrations, pressures, flow rates, etc. are the same to within ±0.1%, ±1%, ±2%, ±5%, ±10%, ±20%, etc.; etc.) to the environment within the outer chamber, the insulation chamber environment and outer chamber environment can be intermixed, the insulation chamber environment and outer chamber environment can be different, the insulation chamber and outer chamber environments can be isolated from one another, the insulation chamber and outer chamber environments can be in unidirectional communication (e.g., during operation), and/or the insulation chamber and outer chamber environments can be otherwise related.

3.3 Retort

The retort 300 preferably functions to provide a retort environment (e.g., a clean environment such as an atmosphere with a low concentration of reactive agents, an inert atmosphere, etc.; a uniform thermal environment; etc.). The retort is preferably arranged within the insulation chamber (e.g., inside the cavity defined by the insulation); however, the retort can be arranged in the outer chamber and/or in any suitable manner.

The retort 300 is preferably supported off the bottom of the insulation (and/or insulation chamber) by feet 310; however, the retort can be supported by a baseplate, on a stand, directly on the insulation (e.g., bottom of the retort can be in contact with the insulation), and/or the retort can be arranged in any suitable manner. The retort volume is preferably fluidly connected to (e.g., in fluid communication with) the insulation volume (e.g., substantially unidirectionally fluidly connected, bidirectional fluid connection, etc.), but can additionally or alternatively be fluidly isolated from the insulation chamber. The retort is preferably thermally connected to (e.g., equilibrated) with the insulation chamber cavity, but can additionally or alternatively be thermally insulated from the insulation chamber cavity.

The retort material is preferably graphite; however, additionally and/or alternatively, the retort can be made of carbon fiber composite (CFC), carbon fiber reinforced composite (CFRC), silicon carbide (SiC), zirconia ($ZrO_2$), high temperature steel (e.g. Kanthal APM), and/or any suitable material. The retort geometry can depend on the part parameters (e.g., number of parts, size of the parts, shape of the parts, orientation of the parts, part material, etc.), the target temperature (e.g., sintering temperature, debinding temperature, etc.), gas flow properties, be predetermined, and/or be selected in any suitable manner. In a first set of examples, any dimension of the retort (e.g., length, width, height) can be any suitable value and/or range thereof between 4 and 12 inches; however, the retort can have any suitable size. In a second set of examples, any dimensions of the retort and/or the retort volume can be 1%, 5%, 10%, 20%, 30%, 50%, 75%, 90%, 95%, and/or any suitable fraction or percentage of the insulation chamber and/or outer chamber dimension or volume.

One or more surfaces (e.g., wall, base, floor, top, components within, etc.) of the retort are preferably separable from the remaining surfaces, which enables each surface to be replaced. However, the surfaces can be mounted to each other, affixed to one another, permanently secured together, and/or otherwise connected.

In variants, the retort can be removable from the insulation chamber (e.g., replaced with a different retort such as a retort with a different geometry, material, etc.). However, additionally and/or alternatively, the retort can be permanently retained in the insulation chamber (e.g., built into the insulation chamber, fastened to the insulation chamber, and/or arranged in any suitable manner. In a specific example, the retort can be exchanged depending on the part(s) (e.g., part parameters); however, the retort can be exchanged for any suitable reason.

The retort can optionally define a working volume 322, a gas preparation volume 328, and/or any suitable volumes. The working volume 322 is preferably separated from the gas preparation volume 328 by an interfacing wall 325; however, the working volume and gas preparation volume can be continuous, be the same, be connected by a fluid manifold, be thermally connected, be fluidly connected, and/or can be connected in any suitable manner. The interfacing wall 325 preferably functions to allow fluid communication (e.g., gas diffusion, gas effusion, etc.) between the working volume and the gas preparation volume. In a first example, the interfacing wall preferably has one or more cut-outs 327 (e.g., holes, perforations). In this example, the holes (e.g., interfacing holes) can be arranged in a grid (e.g., an evenly spaced grid of holes), patterned, randomly distributed, and/or arranged in any suitable manner. The holes can have any suitable radius between about 1 mm and 10 mm, value therebetween, be smaller than 1 mm, or larger than 10 mm. The interfacing wall can include 1 hole, 2 holes, 3 holes, 4 holes, 5 holes, 10 holes, 20 holes, between 1-50 holes, more than 50 holes, and/or any number of holes. During operation, any number of holes can be open and/or closed. In a second specific example, the interfacing wall can be a permeable wall (e.g., made of a material that allows gas to flow through). However, the interfacing wall can be a baffle, and/or can be arranged in any suitable manner. However, the working volume, atmosphere preparation volume, and/or any suitable volumes can be the same volume (e.g., the volume defined by the retort), and/or the retort can be arranged in any suitable manner.

Figure 7A:
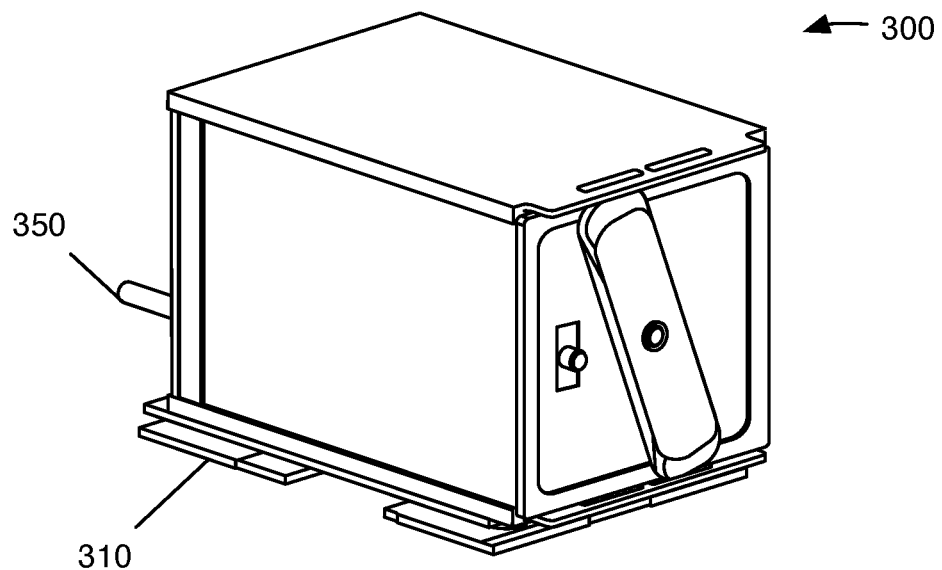
FIG. 7A is an isometric view from the top left of an example of a retort.

The retort (e.g., working volume) can retain one or more build plates 330. The build plates preferably function to mechanically support (e.g., hold) one or more parts (e.g., during printing, during sintering). The build plates can additionally and/or alternatively function to modify airflow (e.g., within the retort, within the working volume, etc.). In a series of specific examples, the build plates can modify the air flow by dividing the working volume into separate zones, by blocking one or more interfacing holes (e.g., in the interfacing wall), by channeling gas flow in specific manners around or over a part based on the build plate position relative to the interfacing holes, and/or the build plates can modify the air flow in any suitable manner. The build plates can additionally or alternatively modify the temperature profile within the working volume (e.g., by selectively absorbing, conducting, or convecting heat). The build plate(s) can be made of ceramics (e.g., alumina, etc.), CFC, CFRC, steel, molybdenum, nickel superalloys, and/or any suitable material can be used. The build plate(s) are preferably modular (e.g., can be inserted into and removed from the retort); however, the build plates can be permanently secured to the retort, and/or the build plates can be connected to the retort in any suitable manner. In a specific example, one, two, and/or three build plates can be included in the retort. The build plates may be supported on one or more stands or base plate surfaces 360 that can be freestanding, part of the retort, part of the build plate, as shown for example in FIGS. 7C and 7D, and/or otherwise constructed. The build plates can be arranged to divide the volume (e.g., working volume, retort volume, etc.) into equal spaces (e.g., build plates can be evenly stacked vertically above one another). In a second specific example, the build plates can be stacked at different heights using rails and/or blocks. However, any suitable number of build plates can be included and/or the build plates can be arranged in any suitable manner (e.g., unevenly dividing the volume).

The retort (e.g., working volume) can optionally include one or more thermal modifiers 330. The thermal modifiers preferably function to manage the heat distribution within the retort (e.g., to make the temperature profile more uniform, to concentrate heat on a part, to disperse heat around a part, etc.). The thermal modifiers can additionally or alternatively function to modify the air flow within the retort (e.g., working volume). The thermal modifiers can be mounted to the build plate(s), retort wall(s), retort base, retort ceiling, suspended within the retort, and/or arranged in any suitable location. The thermal modifiers are preferably modular (e.g., can be added, moved, removed, etc. as needed such as for different parts, for different temperature profiles, for different air flow profiles, etc.); however, the thermal modifiers can additionally or alternatively be permanently fixed (e.g., a structural component of the retort) and/or configurable in any suitable manner. The thermal modifiers can be insulators (e.g., zirconium oxide (ZrO2), hafnium oxide (HfO2), etc.), reradiators (e.g., SiC, graphite, molybdenum (Mo, such as in a textured form), tungsten, Inconel, Hastelloy®, Nimonic®, etc.), conductors, heatsinks, and/or any suitable material.

The retort (e.g., gas preparation volume) preferably includes one or more retort gas ports 350. The retort gas ports preferably function to introduce gas (e.g., inert gas, oxidative agents, forming gas, etc.) into and/or remove gas from (e.g., vent) the retort. One or more of the retort gas ports can be directly connected to the outer chamber gas ports or insulation chamber gas ports; however, the retort gas ports can be indirectly connected to the outer chamber gas ports, separate from the outer chamber gas ports, and/or the retort gas ports can be arranged in any suitable manner. The gas ports are preferably aligned with the top of the build plates, but can additionally or alternatively be arranged a predetermined distance away from the build plates, arranged along a line, arranged in a grid, or be otherwise arranged. The gas ports can be selectively opened and closed (e.g., via manual plugs, valves, etc.), be always open, or be otherwise controlled. The gas ports are preferably ceramic (e.g., to protect the tube from oxidation by the atmosphere of the insulation chamber), but can additionally or alternatively be steel, graphite, plastic, or any other suitable material. The gas flow (e.g., upon entering the retort, upon exiting the retort gas port, etc.) is preferably along a gas flow axis; however, the gas flow can be diffusive and/or follow any suitable path. The gas flow axis is preferably perpendicular to a reference surface (e.g., a baffle surface such as a baffle wall, a retort surface such as a retort wall, etc.); however, the gas flow axis can be parallel to the reference surface and/or arranged in any suitable manner. The gas flow within the retort can be laminar and/or turbulent. The gas flow is preferably diffusive; however, the gas flow can be effusive, advective, a combination of the above, and/or have any suitable flow characteristics.

The gas flow rate into and/or within the retort can be any suitable value and/or range thereof between 0.1 to 550 L/min; however, any suitable gas flow rate can be used. In a series of examples, the gas flow can be 0.1-1, 1-2, 2-5, 1-10, 5-10, 5-15, 10-20, 10-50, 25-100, 75-200, 200-300, 100-500, 300-550 L/min, values therebetween, less than 0.1 L/min, or greater than 550 L/min. The retort gas flow rate and/or retort pressure is preferably greater than, but can be the same as and/or less than, the gas flow rate and/or pressure in the insulation chamber and/or outer chamber. In an illustrative example, the gas flow rate into the retort can be approximately 100× greater than the gas flow rate into the insulation chamber or the outer chamber. However, the gas flow rate into the retort can be 1.5×, 2×, 5×, 10×, 20×, 50×, values or ranges therebetween, less than 1.5× (e.g., 1×, 0.5×, 0.25×, 0.1×, etc.), or greater than 100× the gas flow rate into the insulation chamber or the outer chamber. The retort gas flow can follow the same or a different gas flow profile as in the intermediate chamber(s).

Gas preferably exits the retort through a combination of vent holes and/or through leaks (e.g., in the door of the retort, in the walls of the retort, etc.); however, the retort can include a retort exhaust port (e.g., connected to the outer shell vacuum port, connected to the same exhaust mechanism as the outer shell, connected to a different exhaust mechanism from the outer shell, etc.), vents, egress ports (e.g., defined through the retort thickness), egress manifolds, and/or any suitable gas egress path. The gas egress preferably opposes the gas ingress port(s) across the retort cavity, but can additionally or alternatively be arranged on an adjacent wall, on the same wall, or otherwise arranged. The gas egress is preferably arranged proximal to the gas ports (e.g., reactive gas ports) in the insulation chamber. However, the gas egress can be distal to and/or arranged in any suitable manner relative to the insulation chamber gas ports. The waste gas from the retort (e.g., including sintering byproducts such as organic species released by the part precursor or part during sintering) is preferably exhausted into the insulation chamber cavity, but can additionally or alternatively be exhausted into the outer cavity, into the ambient environment, or otherwise managed.

In variants, the sintering byproducts can be oxidized (e.g., by the reactive agent(s)) within the insulation chamber cavity before egress (e.g., to the outer cavity, to an exhaust port extending through the outer shell to a vacuum, to an exhaust system, to the ambient environment, etc.). The gas composition in the retort and the insulation chamber are preferably different, but can be the same. The reactive agent concentration within the retort is preferably less than the reactive agent concentration within the surrounding chamber(s) (e.g., insulation chamber, intermediate volume, outer chamber, etc.), but can be equal to or greater than the reactive agent concentration within the surrounding chamber(s). The reactive agent concentration within the retort can be a value or range between about 1.1 and 1000 times lower than the reactive agent concentration within the surrounding chamber(s) such as 1.2 times, 1.5 times, 2 times, 5 times, 10 times, 20 times, 50 times, 100 times, 200 times, 500 times lower; and/or less than 1.1 times lower or greater than 1000 times lower than the reactive agent concentration within the surrounding chamber(s). In an illustrative example, when the reactive agent concentration within the surrounding chamber is approximately 1000 ppm the reactive agent concentration within the retort volume can be approximately 900 ppm, Boo ppm, 500 ppm, 200 ppm, 100 ppm, 50 ppm, 20 ppm, 10 ppm, 5 ppm, 2 ppm, 1 ppm, 0.5 ppm, 0.1 ppm and/or any suitable reactive agent concentration. However, each volume can have any suitable reactive agent concentration. The gas composition in the retort is preferably inert gas (e.g., to prevent a reaction from occurring with the part) and the gas composition in the insulation chamber preferably includes one or more reactive agents to react with byproducts (e.g., sintering byproducts). However, the gas composition in the retort and the insulation chamber can be the same and/or the reactive agent concentration within the retort can be higher than in the insulation chamber. In this and related variants, the byproducts can additionally or alternatively be oxidized (or otherwise reacted) within the outer chamber volume. For example, the byproducts can be reacted proximal the exhaust mechanism of the outer chamber.

Properties of the byproduct oxidation (e.g., rate, location, degree of completion, etc.) can be controlled based on a temperature (e.g., of the byproducts, of the reactive agents, of the retort, of the insulation, of the outer chamber, etc.), a pressure (e.g., in the retort, in the insulation chamber, in the outer chamber, etc.), a flow direction (e.g., where the byproducts leaving the retort intersect a flow of the reactive agents within the outer chamber), a species concentration (e.g., reactive agents concentration, byproduct concentration, etc.), a residence time (e.g., for byproducts or reactive agents within the outer chamber volume), and/or responsive to any system parameter. The waste gas (e.g., byproducts, reacted byproducts) can additionally or alternatively be used to heat the ingressed gas supplied to the insulation chamber (e.g., wherein the exit manifold is thermally connected to and fluidly isolated from the inlet manifold).

The retort (e.g., gas preparation volume) preferably includes a gas management mechanism that functions to heat gas (e.g., introduced gas such as inert gas, reactive agents, etc.) to a predetermined temperature (e.g., to the insulation chamber temperature, to a temperature greater than room temperature, to a sintering temperature, to a debinding temperature, to within a threshold of a target temperature, etc.) prior to reaching the part(s).

In a first variation, the gas management system includes a heater arranged along the inert gas manifold. The heater can be: an active heater, a passive heater (e.g., leveraging waste heat), or any other suitable heating element. In a first example, the heater can be a resistive coil wound around the inert gas manifold. In a second example, the heater can be an exhaust manifold from the retort that is fluidly isolated from and thermally coupled to the inert gas manifold.

Figure 3:
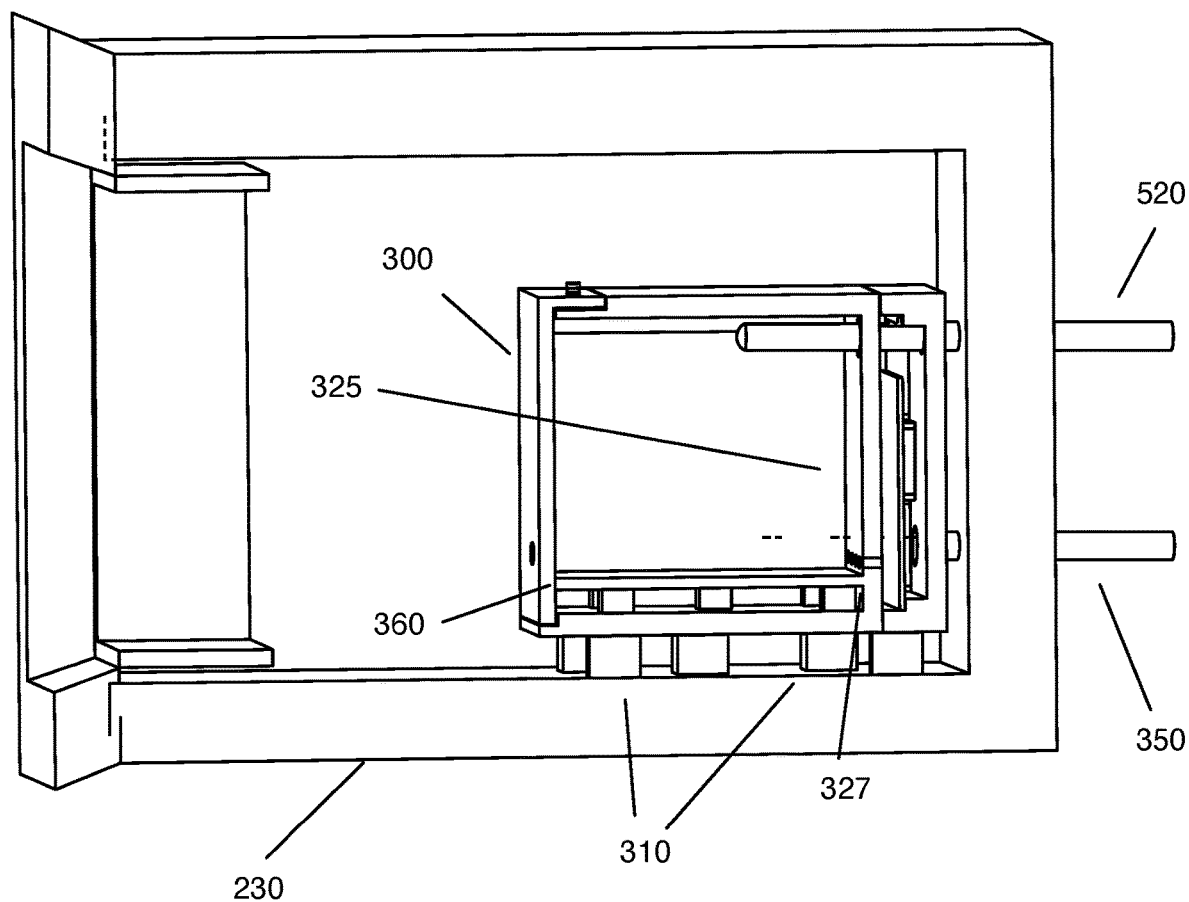
FIG. 3 is a cut-out view of a schematic representation of an embodiment of the retort.
Figure 7B:
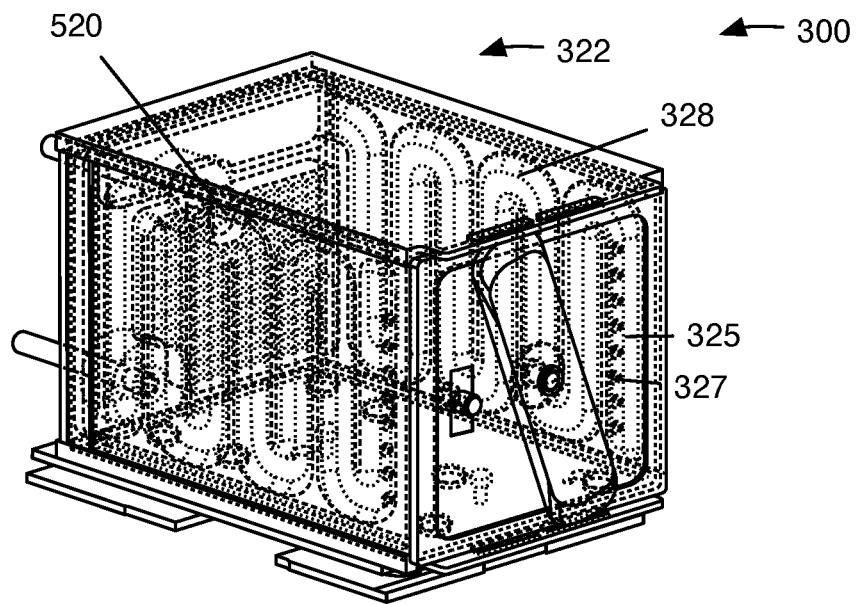
FIG. 7B is a transparent isometric view from the top left of an example of a retort.

In a second variation, the gas management system includes a residency flow path defined within the retort. The residency flow path preferably heats the ingressed gas by increasing the path length that the gas must travel within the insulation chamber prior to reaching the part(s), but can otherwise heat the ingressed gas. The residency flow path is preferably arranged between the retort gas inlet and the working volume, but can additionally or alternatively be arranged around the perimeter of the retort (e.g., along the interior walls, exterior walls, as shown in FIG. 7B, etc.), or be otherwise arranged. In a first example, the residency manifold is defined by a set of tubes that are fluidly connected to the retort's gas inlet and thermally connected to but fluidly isolated from the retort interior along their length. In a second example, the residency flow path includes a set of baffles. The baffles can function to modify one or more gas flow properties such as turbulence, rate, directionality, pressure, spread, and/or any suitable gas flow properties can be modified. The baffles preferably cooperatively define a tortuous flow path between the retort gas inlet and the working volume (e.g., boustrophedonic in cross section, spiral wound, etc.), but can additionally or alternatively define a linear flow path or any other suitable flow path. The retort (e.g., gas preparation volume) can include any suitable number of baffles, for example, one to four baffles (for example, as shown in FIG. 3). In a set of specific examples, baffles can be staggered walls (e.g., vertically staggered, horizontally staggered, diagonally staggered, etc. such as having a gap between the retort and the baffle along one or more directions where the gap can be staggered between baffles); a set of one or more walls, each wall including a set of holes and where the set of holes are substantially not aligned (e.g., not in the same flow path) between walls; a porous material (e.g., wherein the gas can be inserted into the porous material), and/or configured in any suitable manner.

In an illustrative example of a gas flow path through the retort, gas can be injected into the retort (e.g., a gas preparation volume) by a gas port arranged in a back of the retort, flow along a gas management system (e.g., along a tortuous path), be injected into the working volume by a plurality of vent hole fluidly coupling the gas preparation volume to the working volume, and then be ejected from the retort into the insulation volume. However, the gas flow path can be otherwise defined.

The carbon potential (e.g., a carbon content of a sheet of iron in equilibrium with the atmosphere, capability of the furnace to impart carbon into steel, etc.) of the retort environment is preferably substantially neutral (e.g., carbon is neither driven into nor removed from the part or part precursor, change in carbon levels within the part less than about 0.1%, 1%, 2%, 5%, 10%, 20%, etc.). For instance, a carbon content (e.g., concentration) of an environment within the retort volume is approximately equal to a carbon content (or target carbon content) of the part (e.g., finished part, sintered part, etc.). However, the carbon potential within the retort can be positive (e.g., carburizing such as an environment that includes excess carbonaceous material such as charcoal, carbon monoxide, carbon dioxide, methane, ethane, propane, butane, etc.) or negative (e.g., decarburizing such as an environment that less carbon and carbon removing agents oxygen, hydrogen, water, etc.). In variants, the carbon potential within the retort can be controlled by introducing a species (e.g., using the inert gas port, using a separate gas port) that functions to modify the carbon potential within the retort. In a first illustrative example, the retort environment can include one or more inert gas which can provide a substantially neutral carbon potential. In a second illustrative example, one or more sintering byproduct can be present in the retort volume which can provide a carburizing environment. In a third illustrative example, one or more carbonaceous material (e.g., organic molecules, inorganic carbon source, carbonaceous-oxidizing species, etc.) can be injected into the retort volume (e.g., using a retort gas port, carburizing agent gas port, inert gas port, etc.), which can provide a carburizing environment. However, the carbon content of the atmosphere can be controlled by a flow rate of gas out of the retort (e.g., the sintering byproducts can be used to control the carbon content of the atmosphere of the retort), and/or otherwise be controlled. The carbon potential can be modified actively (e.g., based on a sensor read out such as a carbon sensor) or passively.

The retort can optionally include zone heating (e.g., heating different regions of the retort to different temperatures). The zone heating can be controlled and/or based on retort volumes (e.g., the working volume), environment modifiers, heating elements (e.g., location of heating elements such as relative to the retort, heating element operation parameters, number of heating elements, etc.), retort structure (e.g., wall thicknesses, shape, etc.), and/or can be controlled in any suitable manner.

3.4 Computing System

In variants including a computing system 400, the computing system preferably functions to calculate and/or model thermal properties of the system (e.g., outer chamber, insulation chamber, retort), suggest components (e.g., retort; baffle(s); build plate(s); environment modifier(s); etc.) and component arrangement (e.g., number, location, material, etc.) within the insulation chamber (e.g., based on the part(s), based on one or more system operation parameters, etc.), suggest system operation parameters (e.g., temperature, ramp rate, duration, gas(es), gas flow path, etc.), monitor sensor readings, and/or can perform any suitable function(s). In one example, the computing system can control system operation (e.g., gas flow rate, heat supply, etc.) using closed-loop control, based on the composition of the waste gas stream exiting the system or volumes thereof. For instance, a carbon sensor reading at the exhaust of the outer chamber can be used to determine a property of the reactive agents (e.g., flow rate, pressure, concentration, identity, timing, etc.) to introduce within the system. The computing system is preferably remote (e.g., cloud computing, server, etc.); however, the computing system can be local, distributed, and/or arranged in any suitable manner. In variants including a local computing system, the local computing system is preferably embedded in the outer shell; however, the local computing system can be arranged in a separate container, attached to the outside of the outer shell, or arranged in any suitable manner. In a specific example, the computing system can be distributed between a cloud computing system and a local computing system. In this example, the remote computing system can perform one or more calculations (e.g., modelling, feedback loop, etc.) and the local computing system can control the system operation (e.g., operate the components, transmit sensor measurements to the remote computing system, receive commands such as from the remote computing system, etc.). However, the computing system can be distributed in any suitable manner. The selections (e.g., components, operating parameters, component arrangements, etc.) can be determined based on thermal models of embodiments of the system (e.g., including thermal properties for part(s) to be sintered); however, the selections can be made from a look-up table, from a conditional statement, based on machine learning, based on heuristics, and/or the selections can be made in any suitable manner.

3.5 Sensors

In variants including one or more sensors 500, the sensors preferably function to measure one or more parameters of the insulation chamber, part(s), and/or any suitable component. The one or more sensors can include humidity sensors, temperature sensors (e.g., thermocouples, thermometers, etc.), pressure sensors, air flow sensors, oxygen sensors, carbon sensors 510 (e.g., to detect CO, $CO_2$, one or more organic compounds, etc.), optical sensors (e.g., cameras), mass sensors (e.g., scales), and/or can include any suitable sensor. Examples of carbon sensors include fuel cells, infrared gas sensors, catalysts, and/or any other suitable sensor capable of determining an amount, concentration, ratio, and/or type of carbonaceous (e.g., organic, inorganic carbon) compound. The sensors can be arranged inside and/or outside of the retort, the insulation chamber, the outer shell, within the fluid manifolds (e.g., inert gas manifolds, reactive agent manifolds, egress manifolds, etc.), and/or can be arranged in any suitable location. In a specific example, a thermocouple 520 can be arranged inside the retort (for example, as shown in FIG. 3); however, one or more thermocouples can be included in any suitable component.

One or more sensor readings can optionally be used for active and/or passive feedback of the furnace operation. For example, sensor readings can be used to control a reactive agent property (e.g., concentration, identity, introduction timing, flow rate, partial pressure, etc.), a property of the furnace (e.g., temperature, pressure, local pressure properties of one or more volumes within the furnace, etc.), carbon potential (e.g., with the retort volume), and/or any suitable properties. For instance, when the sensor reading(s) meet or exceed a threshold (e.g., a threshold carbon content, $CO_2$ content, CO content, threshold oxygen content, threshold water content, threshold reactive agent content, threshold byproduct content, temperature threshold, pressure threshold, etc.), the reactive agent can be injected and when the sensor readings are below the threshold, the reactive agent can stop being introduced. The reactive agent property (e.g., concentration, flow rate, pressure, identity, etc.) can be proportional to, inversely proportional to, selected from a look-up table (e.g., relating a sensor reading and a reactive agent property), determined according to a functional relationship between the reactive agent and sensor readings, a minimum or maximum value, or otherwise be related to, determined from, or be independent of the sensor readings. The sensor readings can similarly be used to control a temperature, pressure, and/or any parameter of furnace operation.

In a specific example, one or more thermocouples can be used to measure the temperature (e.g., inside and outside the retort). In this specific example, the thermocouple readings can be used in a cascade arrangement such as the inner thermocouple can be used as a guide and the outer thermocouple can be used to lead a PID loop. However, the thermocouple readings can be used in any suitable manner. In a second specific example, a carbon sensor can detect the amount of carbon or carbonaceous species (e.g., CO, $CO_2$, etc.) emitted from the outer shell (e.g., at an exhaust, at the vacuum port, etc.), emitted from the retort, emitted from the intermediate volume, within the intermediate volume, within the retort volume, within the outer volume, and/or in any location. Based on the readings from the carbon sensor, reactive agents (e.g., $O_2$, $H_2O$, etc.) can be injected into the outer shell, intermediate volume, retort volume, and/or any other volume. In this specific example, the readings from the sensor can be used to control the reactive agent injection (e.g., composition, temperature, flow rate, timing, etc.); however, injection of the reactive agent can occur responsive to other sensor readings and/or in any suitable manner.

However, the sensor readings can be used in any suitable manner.

3.6 Method of Use

The method 20 of using a sintering furnace preferably depends on a set of operation parameters (e.g., operating parameters). The set of operation parameters preferably depends on part properties (e.g., material, numerosity, size, position of parts such as within the retort, part orientation such as within the retort, shape, etc.); however, the set of operation parameters can be independent of part properties. The set of operation parameters is preferably determined by the computing system; however, the operation parameters can be determined by a user and/or in any suitable manner.

The set of operation parameters can be determined from a look-up table (e.g., a table relating a part precursor parameter to a set of operation parameters), responsive to sensor readings, empirically, based on a model of the system (e.g., with or without the part or part precursor), based on historical data, based on processing (e.g., debinding, sintering) progress, and/or be otherwise determined.

The set of operation parameters can include one or more of: gas operation parameters (e.g., pressure; gas flow rate; gas flow profile; gas composition; type; gas injection location such as where to introduce in the system such as outer shell, retort, insulation chamber, etc.; temperature; etc.), temperature (e.g., temperature profile, ramp rate, sintering temperature, debinding temperature, etc.), retort (e.g., size, material, gas management system, etc.), baffles (e.g., numerosity, number, position, etc.), thermal modifiers (e.g., numerosity, size, shape, location, type, material, etc.), build plate (e.g., numerosity, position, etc.), duration (e.g., for sintering, for cleaning, for loading, for debinding, etc.), and/or any suitable operation parameters can be included. The set of operation parameters can be the same or different for each volume of the system (e.g., intermediary volume such as outer chamber volume, insulation chamber volume; retort volume; etc.). When more than one gas is injected into and/or removed from the system, each gas can have the same or different gas operation parameters.

In a first specific variant, the gas composition (e.g., gases injected into the system, into the outer chamber volume, the insulation volume, the retort volume, etc.) can be approximately 100% (e.g., >95%, >99%, >99.9%, >99.99%, >99.998%, etc.) inert gas(es). The inert gas is preferably Ar; however, can additionally and/or alternatively be $N_2$, He, Ne, Ar, Kr, Xe, combinations of one or more of the above, and/or any suitable inert gas. In a specific example of this variant, reactive agents can be present in the insulation chamber environment (e.g., by desorbing from the insulation, intentionally introduced such as through a gas port, etc.). In a second specific variant, the gas composition introduced to the retort can be approximately 100% (e.g., >95%, >99%, >99.9%, >99.99%, >99.998%, etc.) inert gas(es) and the gas composition introduced to the intermediate volume (e.g., outer chamber volume, insulation volume) can include a dosed amount (e.g., 1 ppm, 10 ppm, 100 ppm, 1000 ppm, 0.1%, 1%, 5%, 10%, etc.) of reactive agents with the remainder including inert gases. In this specific variant, the reactive agents can be introduced at the same time as the inert gas is introduced to the retort, before the inert gas is introduced to the retort, and/or after the inert gas is introduced to the retort. In this specific variant, the reactive agents can be dosed at a temperature (e.g., dosing temperature). In a specific example, the dosing temperature can be any suitable temperature and/or range thereof between 0° C. to 1400° C. such as 900-1000° C.; however, the reactive agent(s) can be introduced at any suitable temperature. In a third specific variant, for example to regenerate one or more system components, forming gas (e.g., 1-99% $H_2$ gas with the remainder including an inert gas such as $N_2$) can be introduced into the system (e.g., for a given duration of time, until a sensor indicates that the system is regenerated, etc.). However, any suitable gas composition can be introduced at any suitable location in the system.

As shown for example in FIG. 8, the method of use preferably includes loading (e.g., manually such as by a user; automatically such as by a robot, rail system, track, etc.) one or more parts or part precursors into the system; controlling the system atmosphere; heating the insulation chamber (and/or retort) to a target temperature, for a target duration); optionally, cycling the atmosphere (e.g., to rapidly cool the insulation chamber and/or part); optionally, injecting reactive agents to decompose sintering byproducts; and/or any suitable steps.

4. Specific Examples

Figure 2:
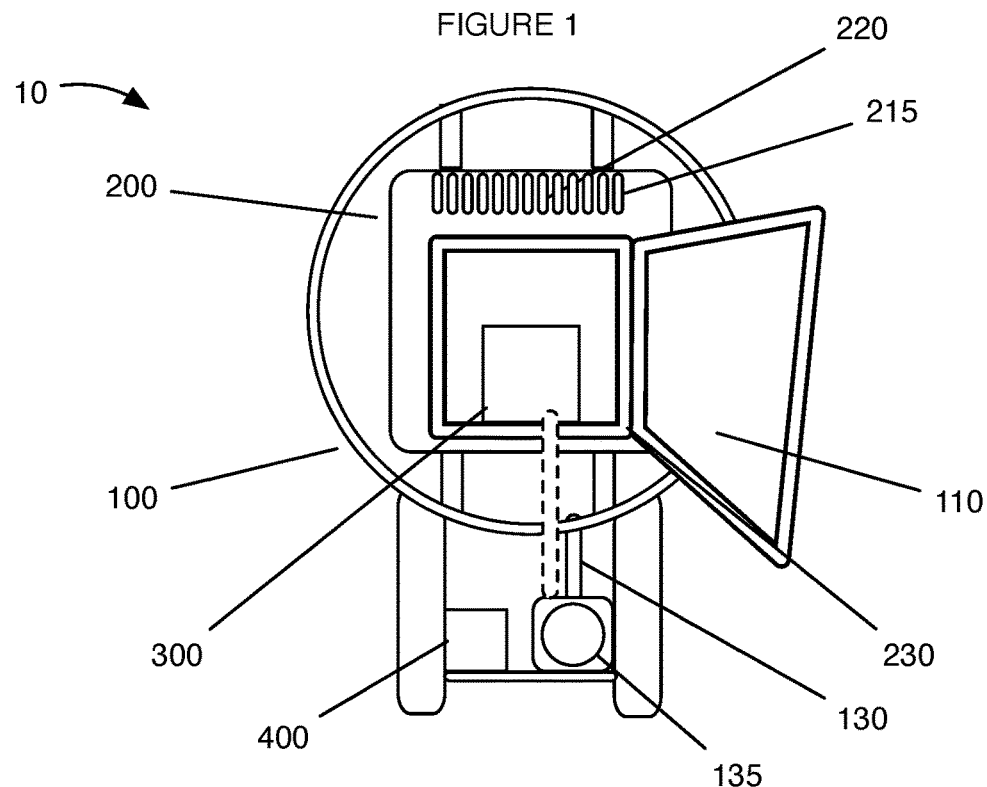
FIG. 2 is a schematic representation of an embodiment of the system.

In a specific example, as shown in FIG. 2, the system can include an outer shell made of stainless steel. The outer shell can be coupled to a vacuum pump, a computing system, one or more gas sources (e.g., gas cylinders such as inert gas, reactive agents, etc.), and/or any suitable components. In this specific example, an insulation chamber is preferably arranged inside the outer shell. The insulation chamber preferably includes a heating element arranged along the top of the insulation chamber. The heating element is preferably made of $MoSi_2$; however, any material can be used. The insulation chamber preferably includes insulation. The insulation is preferably made of bubble alumina; however, any suitable insulation can be used. A retort is preferably arranged inside the insulation. The retort is preferably made of graphite; however, any suitable material can be used. The retort preferably includes at least one baffle, at least one build plate, at least one sensor (e.g., thermocouple), at least one gas connection (e.g., gas port such as connected to an inert gas supply); however, the retort can be arranged in any suitable manner. During use, one or more parts can be placed inside the retort. A vacuum pump can be used to decrease the pressure inside the outer shell (e.g., to any suitable pressure and/or range thereof between $10^{-3}$-750 Torr such as 700 Torr). During use, one or more inert gases can be introduced to the retort. During use, a reactive agent can be present in the system atmosphere (e.g., introduced such as immediately inside the outer shell; desorbed from the insulation; etc.). However, the system can have any suitable form and can have any suitable operation parameters.

Figure 5:
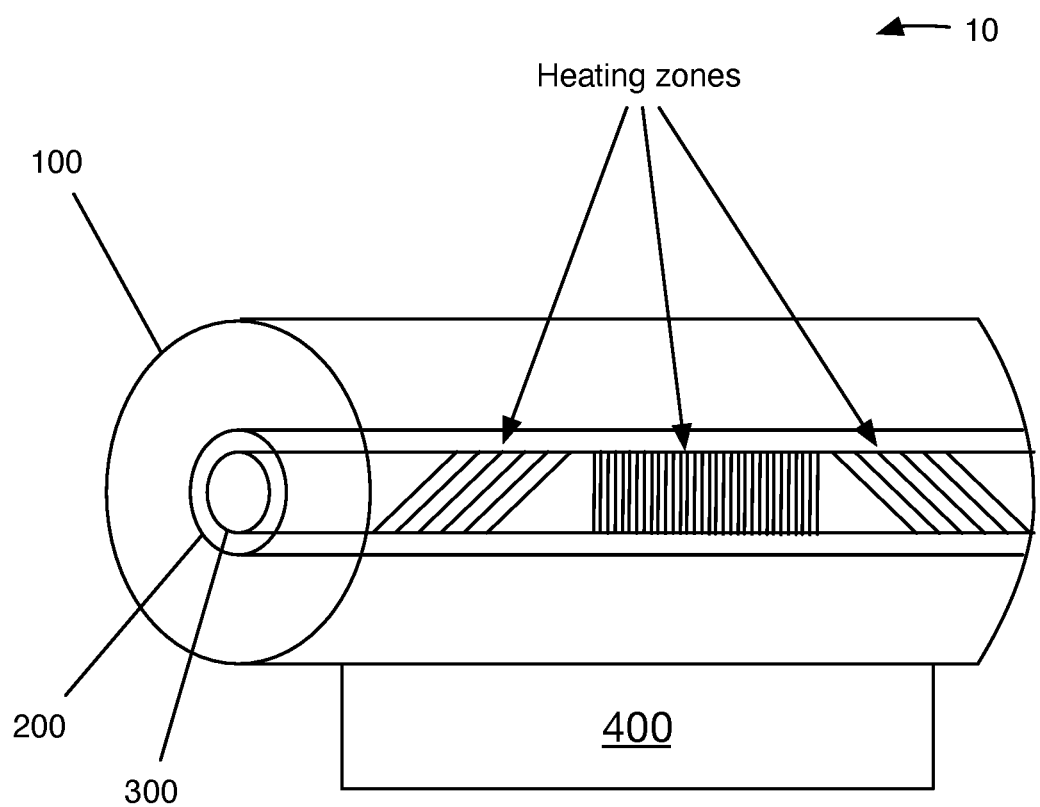
FIG. 5 is a schematic representation of an embodiment of the system.

In a second specific example, as shown in FIG. 5, the system can be arranged similar to a tube insulation chamber. The outer shell can be substantially cylindrical. Cylindrical insulation, that has substantially the same axial length as the outer shell, can be arranged concentrically within the outer shell. A retort (e.g., a tube) can be arranged concentrically within the insulation. The retort can be configured to have one or more heating zones such as to heat different regions to different temperatures (e.g., to sinter different parts, sinter different materials, etc.). The outer shell can be connected to a computing system wherein the computing system is configured to control system operation (e.g., determine operation parameters, set operation parameters, control operation parameters, etc.). However, the system can be arranged in any suitable manner.

Figure 4:
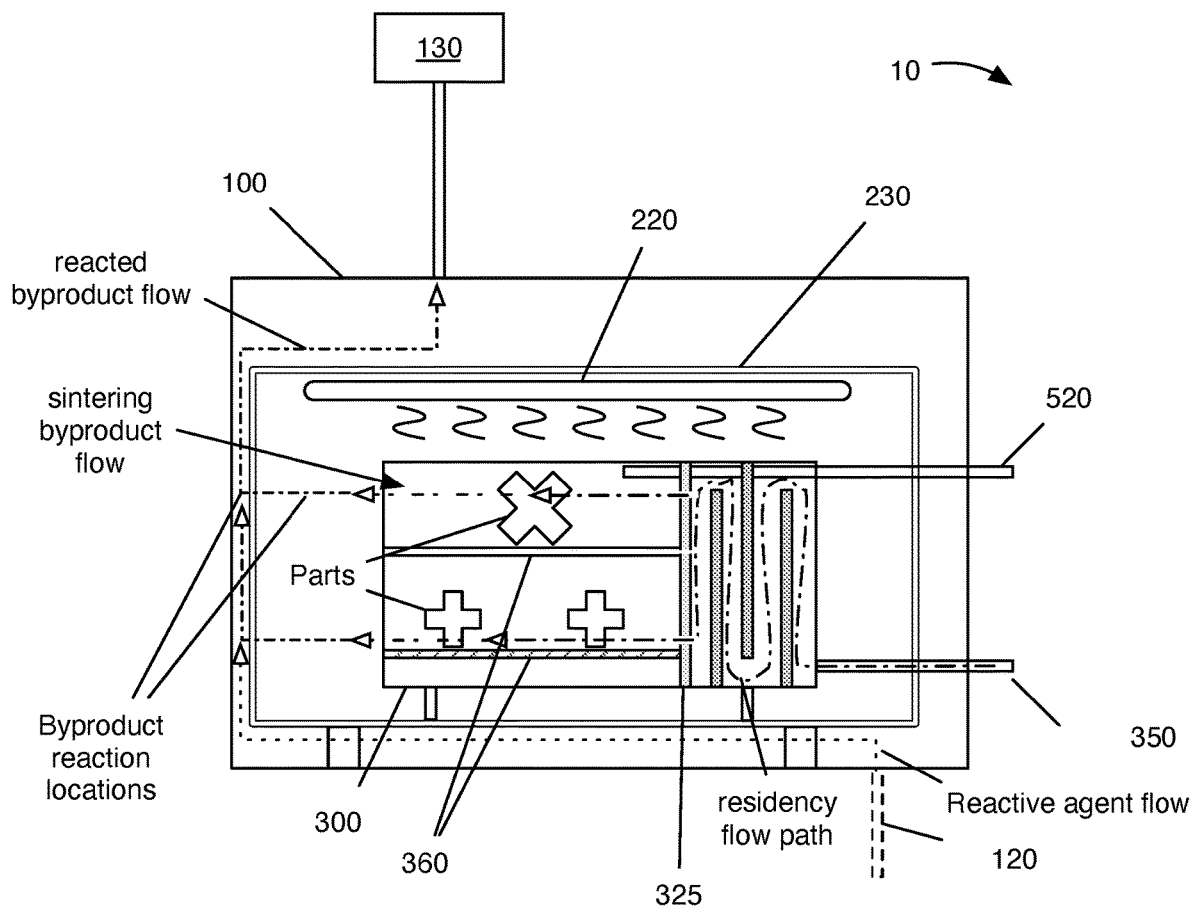
FIG. 4 is a cut-out view of a schematic representation of an embodiment of the system with an example air flow.

As shown in FIG. 4, an example of the gas flow path through the system can start in the retort (e.g., inert gas ports). The gas can flow around the baffles before entering the working volume. The gas (and/or byproducts) can then flow out of the retort (e.g., retort door, retort vents, etc.) and into the insulation chamber (e.g., insulation). Reactive agents can be desorbed from the insulation and/or introduced via a reactive agent port. The reactive agents can react with the byproducts (e.g., in the insulation chamber, in the outer chamber, etc.) producing reacted byproducts. The gas (and/or byproducts, reacted byproducts, reactive agents, etc.) can exit the insulation chamber (e.g., under positive or negative pressure) and enter the outer chamber through the insulation chamber door, through vents, and/or through any suitable path. The gas (and/or byproducts, reacted byproducts, reactive agents, etc.) can be removed from the outer chamber by a vacuum port (e.g., coupled to a vacuum pump) or by positive cavity pressure. However, any suitable gas flow path can be followed, and the gas flow path can include any suitable components at any suitable location along the gas flow path.

Figure 9:
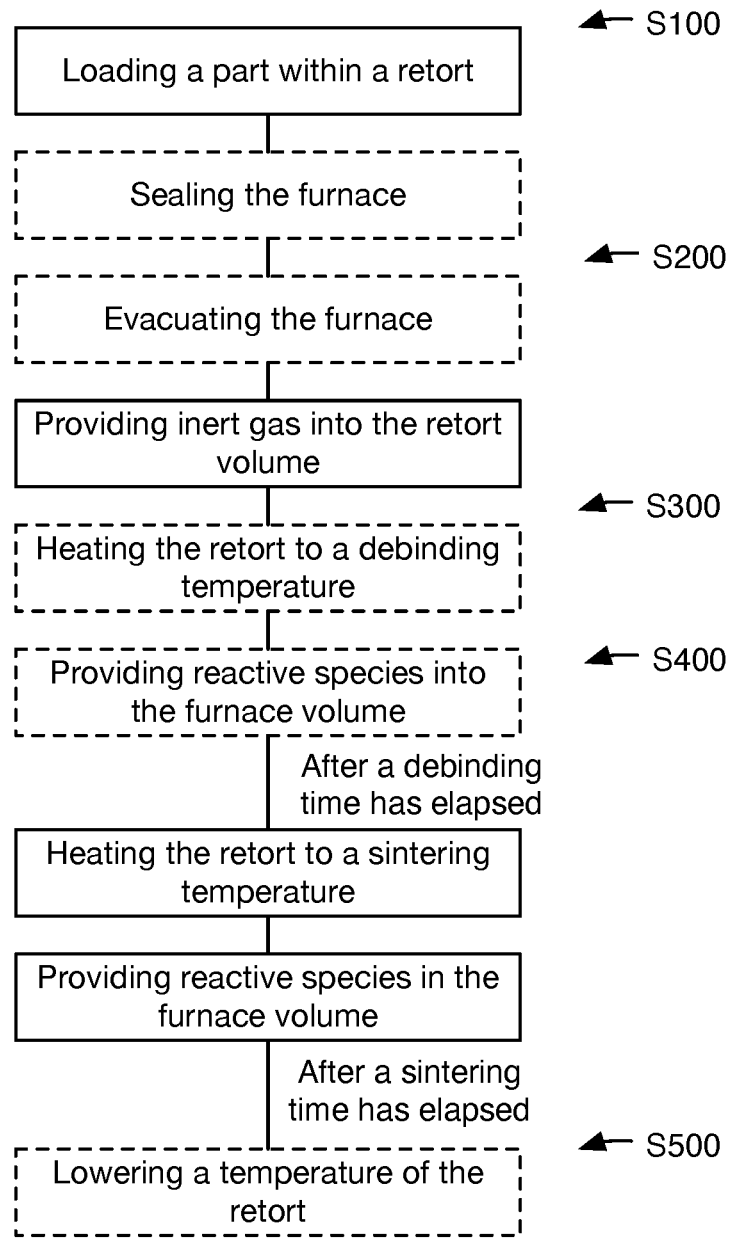
FIG. 9 is a block diagram of an example of operating a sintering furnace.

As shown in FIG. 9, an example of a method of operating a furnace can include loading (e.g., manually such as a user; automatically such as on a rail, by a robot, etc.) a part precursor in the furnace; sealing the furnace (e.g., forming a seal by closing the outer chamber door, latching a door or opening of the retort, closing the insulation chamber door, etc.); optionally, evacuating the furnace (e.g., pulling a vacuum in one or more volume contained within the furnace volume such as the retort volume, insulation chamber volume, outer chamber volume, etc.); providing an inert gas into a retort volume of a retort within the furnace; optionally, heating the retort (e.g., using heating elements) to a debinding temperature; optionally, maintaining the debinding temperature for a debinding duration of time; optionally, providing reactive agents such as oxygen, air, or water to the furnace volume (e.g., volume excluding the retort volume, outer chamber volume, insulation chamber volume, retort volume, etc.); heating the retort to a sintering temperature; maintain the sintering temperature for a sintering time; concurrently with maintaining the sintering temperature, injecting reactive agents into the furnace volume; and optionally, lowering a temperature of the retort (and/or finished part). In this specific example, byproducts from the sintering and/or debinding processes are preferably degraded (e.g., oxidized, reacted with, etc.) outside of the retort volume (e.g., within the furnace volume excluding the retort volume, intermediate volume, outer chamber volume, insulation chamber volume, within an exhaust mechanism of the furnace, etc.), but can be degraded within the retort volume. The degraded byproducts are preferably then expelled from the furnace, but can be collected and/or otherwise treated.

The method and/or system of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for operating a sintering furnace, comprising, in a retort, sintering a part precursor at a sintering temperature to form a finished part, wherein the retort defines a retort volume, wherein the retort is arranged within a chamber defining an intermediate volume between the retort and the chamber, wherein a sintering byproduct is oxidized within the intermediate volume, wherein an inert gas is injected into the retort volume and wherein an oxidizing agent is injected into the intermediate volume, wherein an oxidizing agent concentration within the intermediate volume is at most approximately 1000 parts per million (ppm).

2. The method of claim 1, wherein a carbon content of an environment within the retort volume is approximately equal to a carbon content of the finished part.

3. The method of claim 1, wherein the sintering byproduct flows out of the retort volume into the intermediate volume.

4. The method of claim 1, wherein an inert gas flow rate is greater than an oxidizing agent flow rate.

5. The method of claim 1, further comprising, before sintering the part precursor, debinding the part precursor at a debinding temperature below the sintering temperature.

6. The method of claim 5, wherein the oxidizing agent is injected into the intermediate volume during debinding the part precursor.

7. The method of claim 1, further comprising, measuring a carbon dioxide level, wherein an oxidizing agent flow rate is determined based on the carbon dioxide level.

8. The method of claim 1, wherein the inert gas is preheated within a tortuous chamber of the retort before the inert gas is injected into the retort volume.

9. The method of claim 1, wherein an oxidizing agent concentration within the retort volume is at most approximately 100 ppm.

10. A method for operating a sintering furnace, comprising,
in a retort, sintering a part precursor at a sintering temperature to form a finished part, wherein the retort defines a retort volume, wherein the retort is arranged within a chamber defining an intermediate volume between the retort and the chamber, wherein a sintering byproduct is oxidized within the intermediate volume, wherein an inert gas is injected into the retort volume and wherein an oxidizing agent is injected into the intermediate volume; and
measuring a carbon dioxide level, wherein an oxidizing agent flow rate is determined based on the carbon dioxide level.

11. The method of claim 10, wherein a carbon content of an environment within the retort volume is approximately equal to a carbon content of the finished part.

12. The method of claim 10, wherein the sintering byproduct flows out of the retort volume into the intermediate volume.

13. The method of claim 10, wherein an inert gas flow rate is greater than the oxidizing agent flow rate.

14. The method of claim 10, further comprising, before sintering the part precursor, debinding the part precursor at a debinding temperature below the sintering temperature.

15. The method of claim 14, wherein the oxidizing agent is injected into the intermediate volume during debinding the part precursor.

16. A method for operating a sintering furnace, comprising, in a retort, sintering a part precursor at a sintering temperature to form a finished part, wherein the retort defines a retort volume, wherein the retort is arranged within a chamber defining an intermediate volume between the retort and the chamber, wherein a sintering byproduct is oxidized within the intermediate volume, wherein an inert gas is injected into the retort volume and wherein an oxidizing agent is injected into the intermediate volume, wherein the inert gas is preheated within a tortuous chamber of the retort before the inert gas is injected into the retort volume.

17. The method of claim 16, wherein a carbon content of an environment within the retort volume is approximately equal to a carbon content of the finished part.

18. The method of claim 16, wherein the sintering byproduct flows out of the retort volume into the intermediate volume.

19. The method of claim 16, wherein an inert gas flow rate is greater than an oxidizing agent flow rate.

20. The method of claim 16, further comprising, before sintering the part precursor, debinding the part precursor at a debinding temperature below the sintering temperature.

21. The method of claim 20, wherein the oxidizing agent is injected into the intermediate volume during debinding the part precursor.

* * * * *